(12) United States Patent
Hong et al.

(10) Patent No.: US 9,275,661 B2
(45) Date of Patent: Mar. 1, 2016

(54) MAGNETIC HEAD HAVING A CPP SENSOR WITH TUNNEL BARRIER LAYER AND ELG MATERIAL COPLANAR WITH THE TUNNEL BARRIER LAYER

(75) Inventors: Ying Hong, Morgan Hill, CA (US); David J. Seagle, Morgan Hill, CA (US)

(73) Assignee: HGST Netherlands B.V., Amsterdam (NL)

( * ) Notice: Subject to any disclaimer, the term of this patent is extended or adjusted under 35 U.S.C. 154(b) by 2728 days.

(21) Appl. No.: 11/703,383

(22) Filed: Feb. 6, 2007

(65) Prior Publication Data

US 2008/0186626 A1 Aug. 7, 2008

(51) Int. Cl.
| | |
|---|---|
| *G11B 5/39* | (2006.01) |
| *B82Y 10/00* | (2011.01) |
| *B82Y 25/00* | (2011.01) |
| *G11B 5/31* | (2006.01) |

(52) U.S. Cl.
CPC .............. *G11B 5/3909* (2013.01); *B82Y 10/00* (2013.01); *B82Y 25/00* (2013.01); *G11B 5/3166* (2013.01); *G11B 5/3903* (2013.01); *G11B 5/3169* (2013.01); *Y10T 29/49021* (2015.01)

(58) Field of Classification Search
CPC .. G11B 5/3909; G11B 5/3166; G11B 5/3903; G11B 5/3169; B82Y 10/00; Y10T 29/49021
USPC ................................................ 360/324.2, 328
IPC ....................................................... G11B 5/3909
See application file for complete search history.

(56) References Cited

U.S. PATENT DOCUMENTS

| | | | |
|---|---|---|---|
| 5,065,483 A | 11/1991 | Zammit | |
| 6,609,948 B1 | 8/2003 | Fontana, Jr. et al. | |
| 6,886,239 B2 | 5/2005 | Kasahara et al. | |
| 2003/0020467 A1 | 1/2003 | Kasahara et al. | |
| 2004/0150921 A1* | 8/2004 | Kagami et al. ............. | 360/324.1 |
| 2005/0063101 A1 | 3/2005 | Church et al. | |
| 2005/0070206 A1 | 3/2005 | Kasiraj et al. | |

\* cited by examiner

*Primary Examiner* — Julie Anne Watko
(74) *Attorney, Agent, or Firm* — Zilka-Kotab, PC

(57) ABSTRACT

A magnetic head including a CPP read head sensor. The CPP sensor includes a tunnel barrier layer. At least one portion of ELG material is coplanar with the tunnel barrier layer.

7 Claims, 23 Drawing Sheets

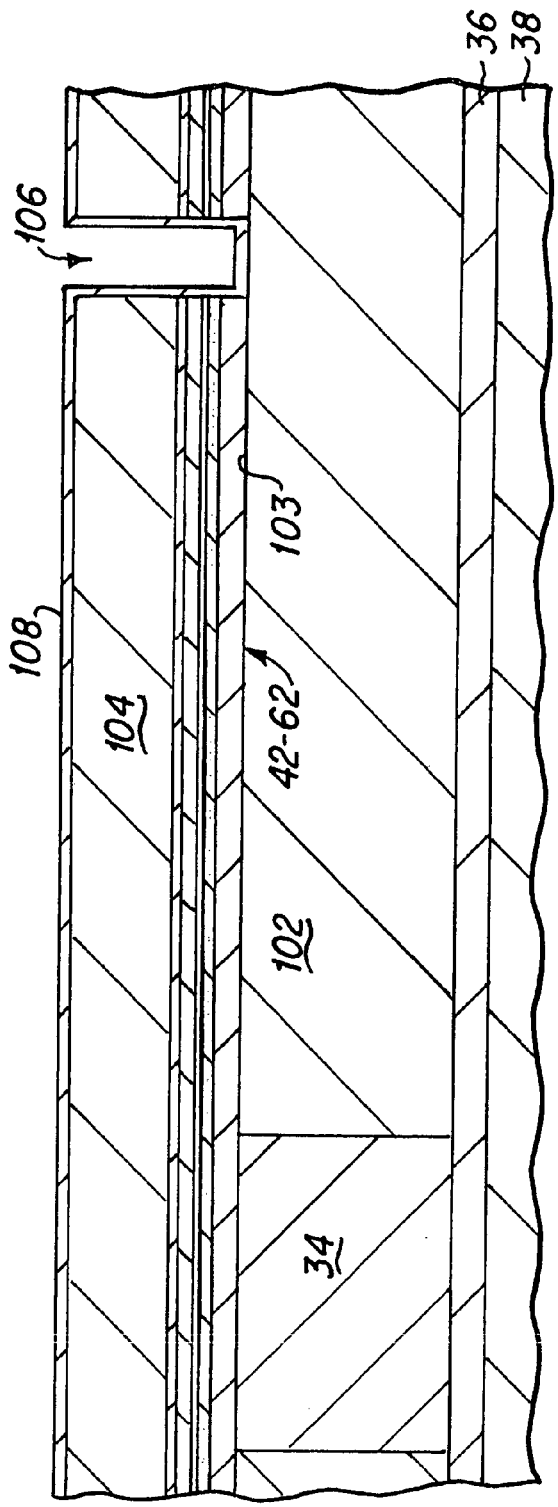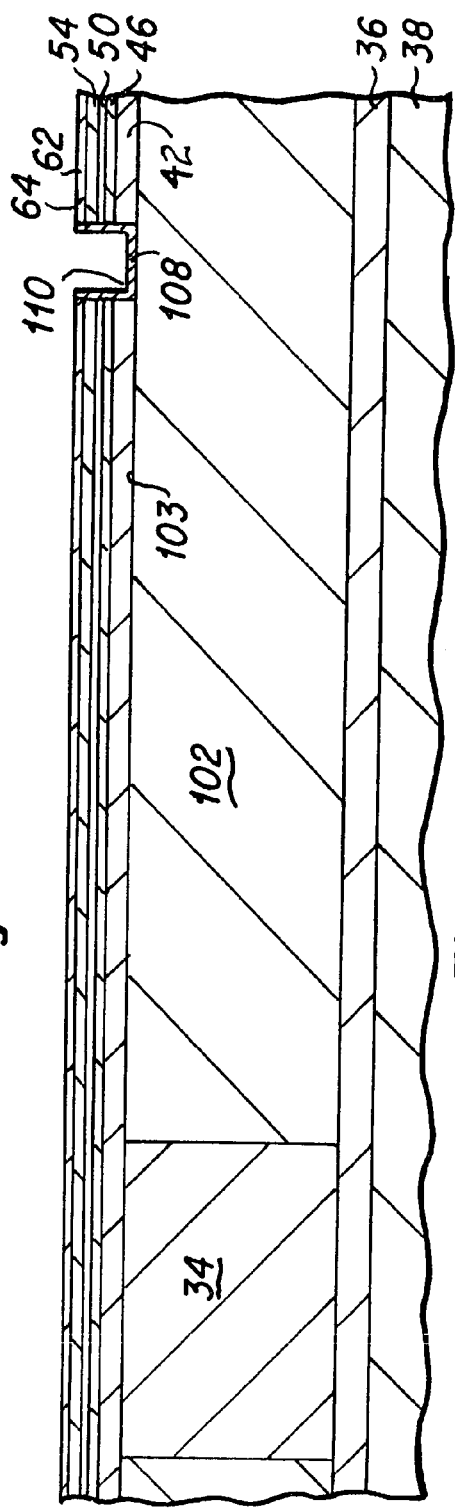
Fig.7 (PRIOR ART)
Fig.8 (PRIOR ART)

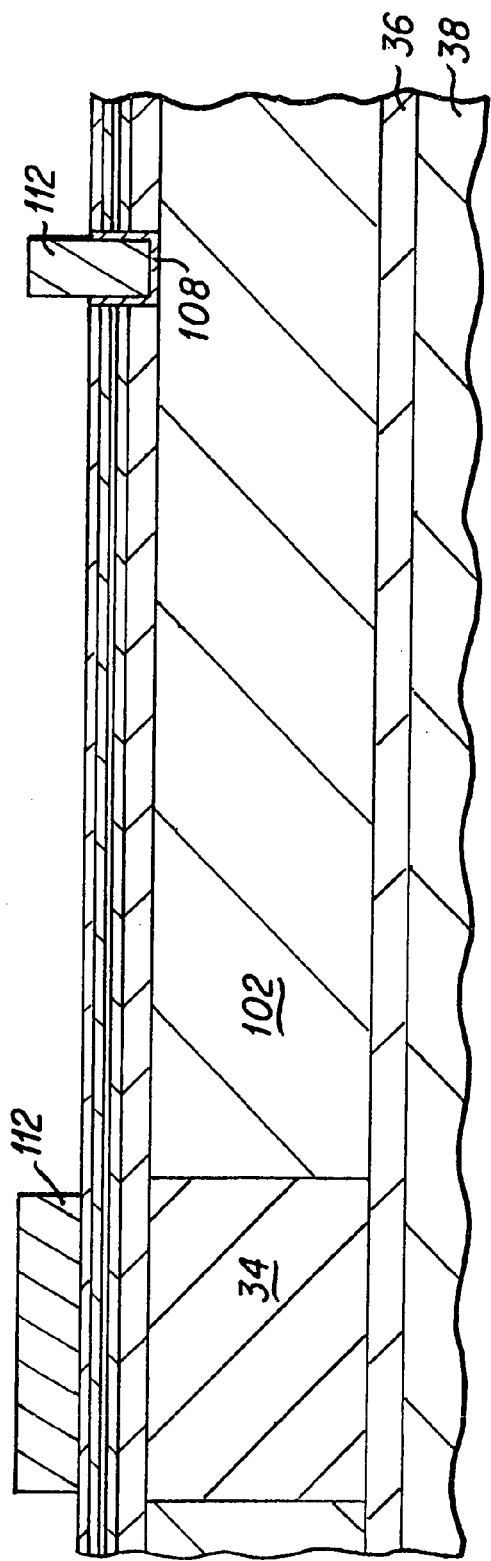
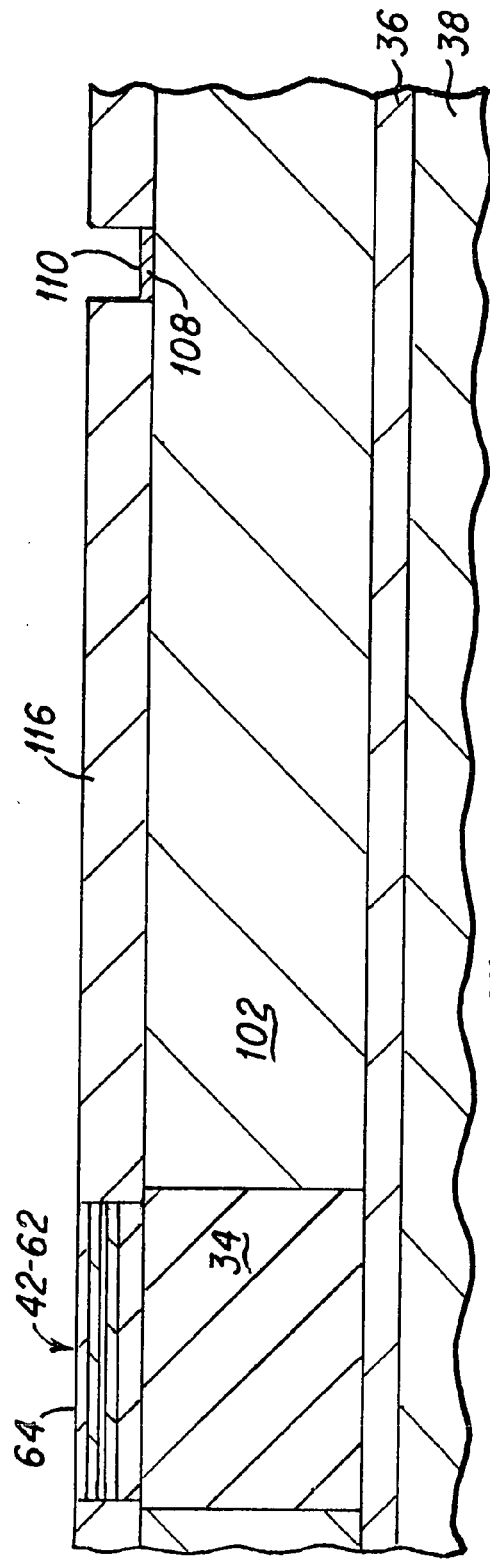

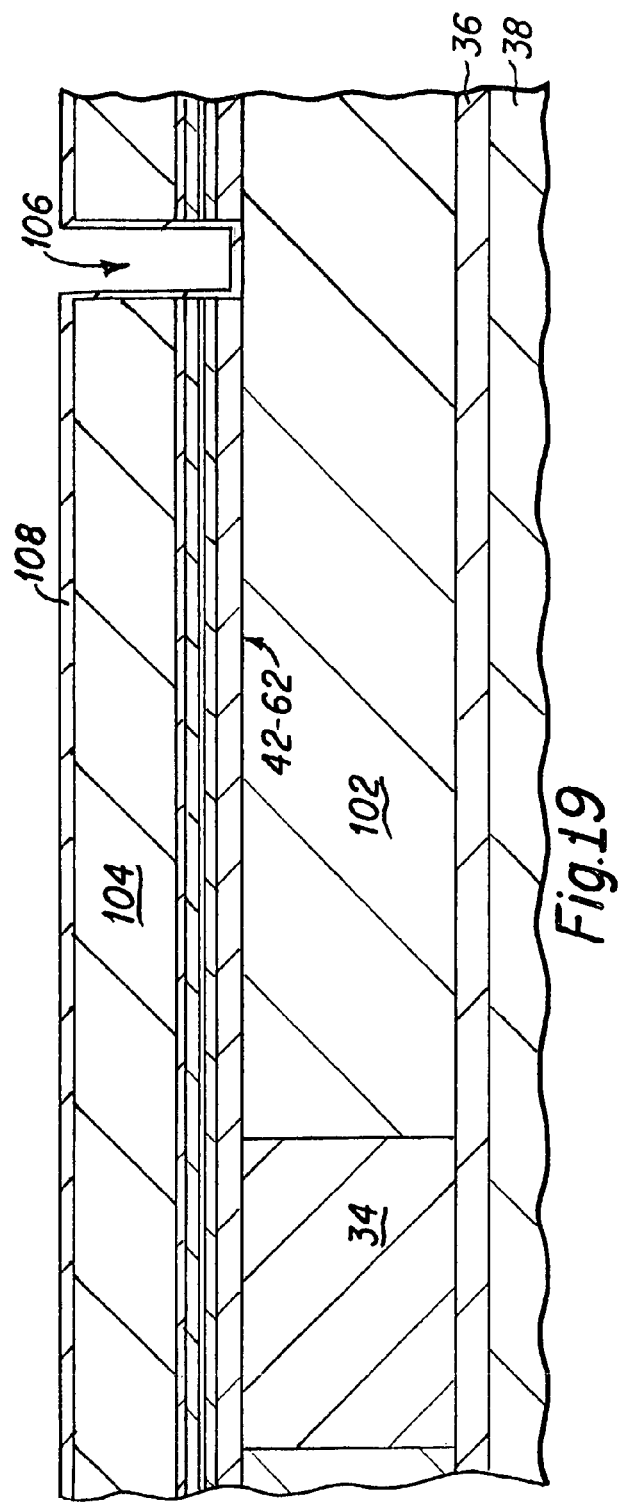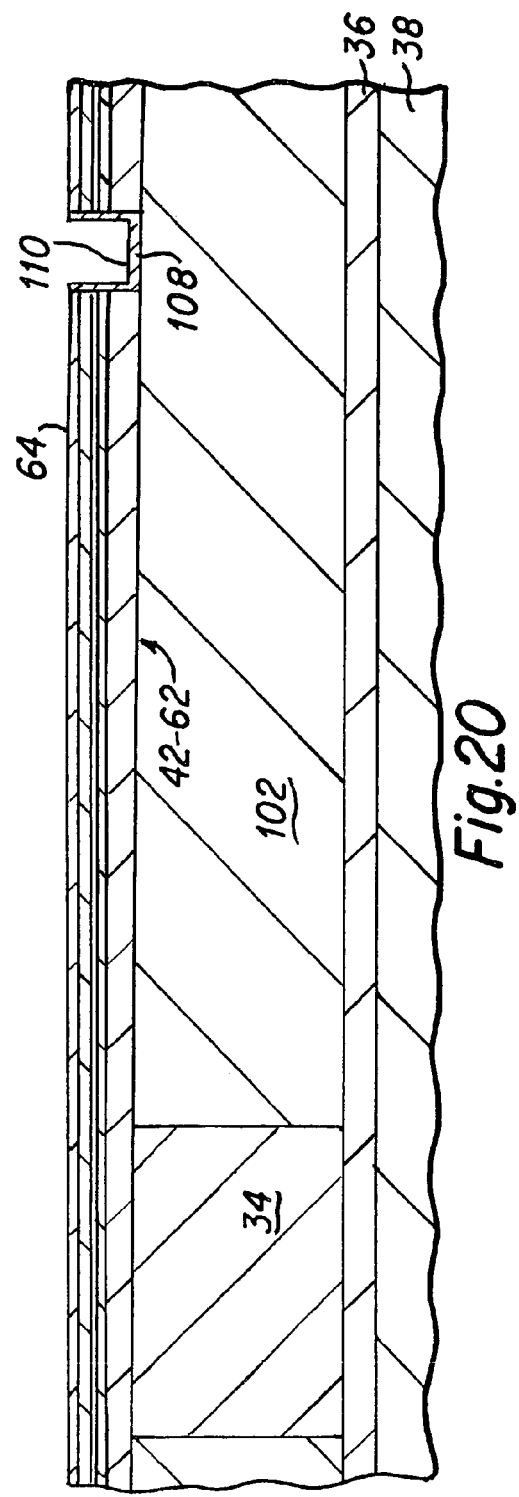

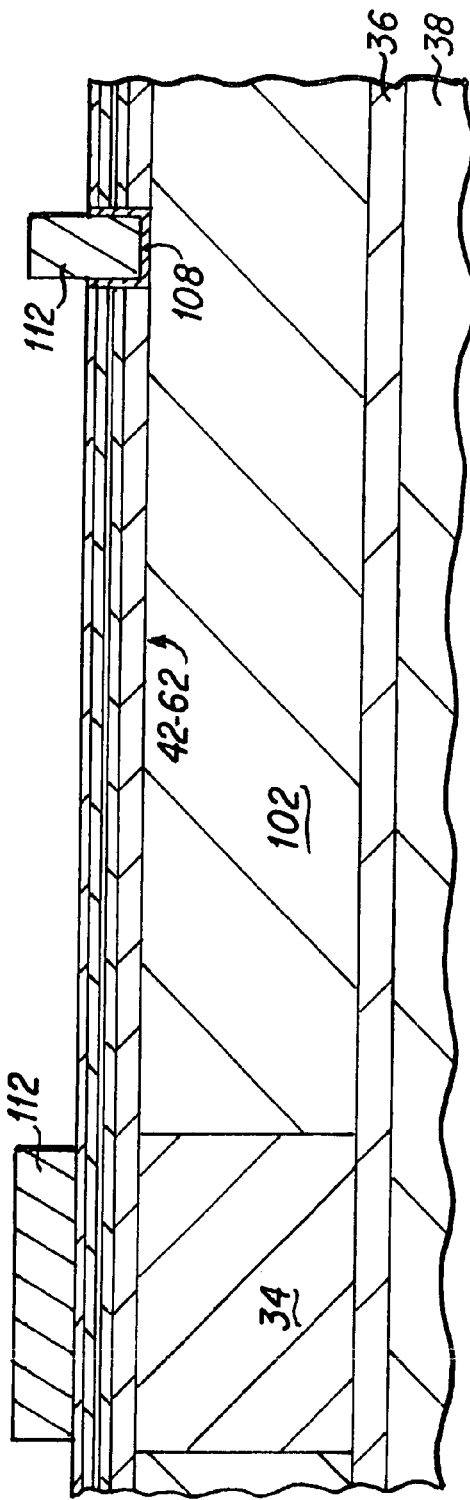
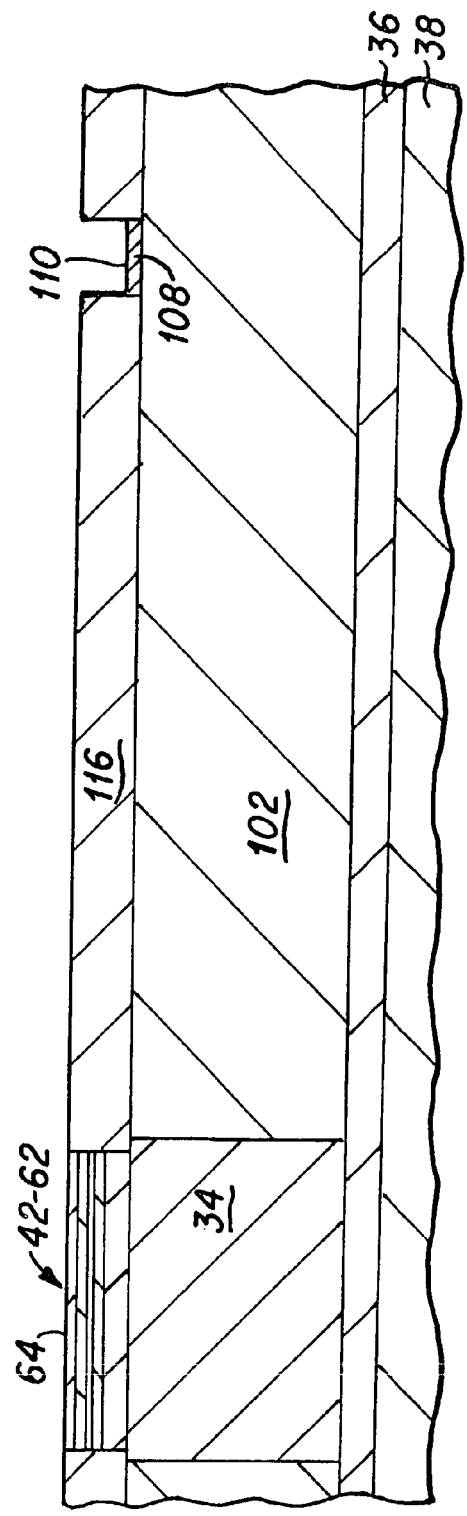
Fig.21
Fig.22

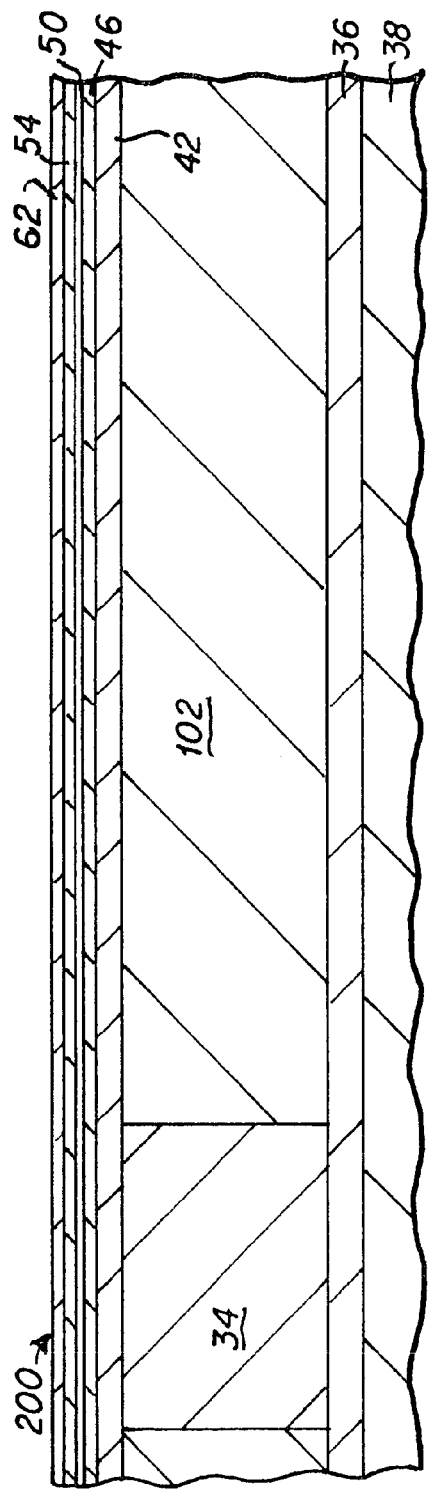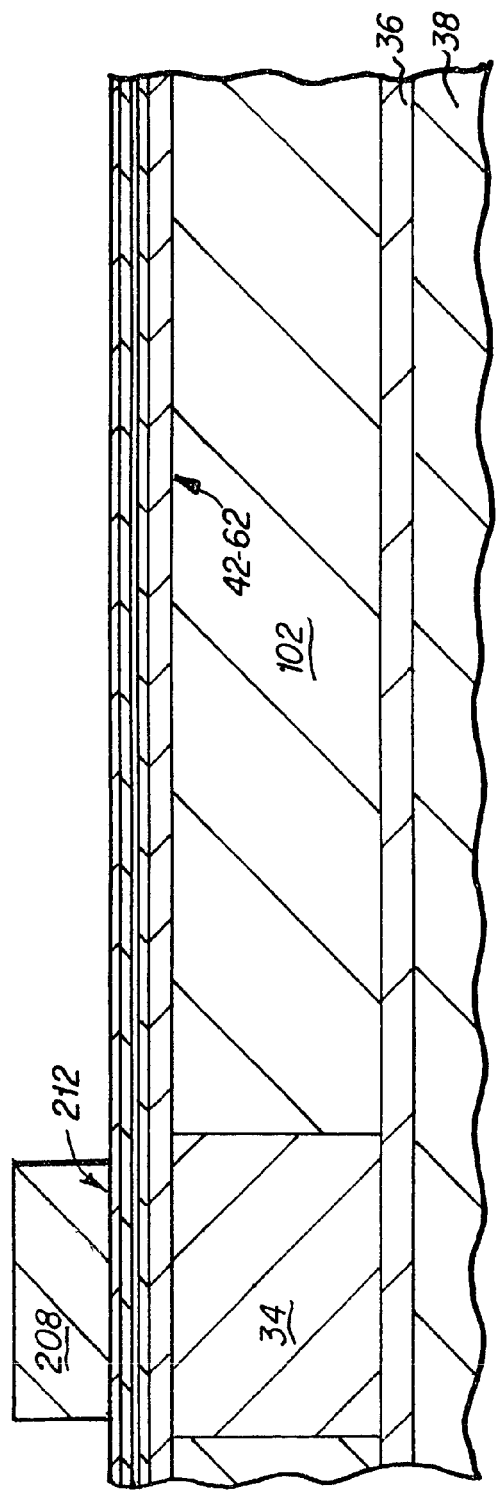

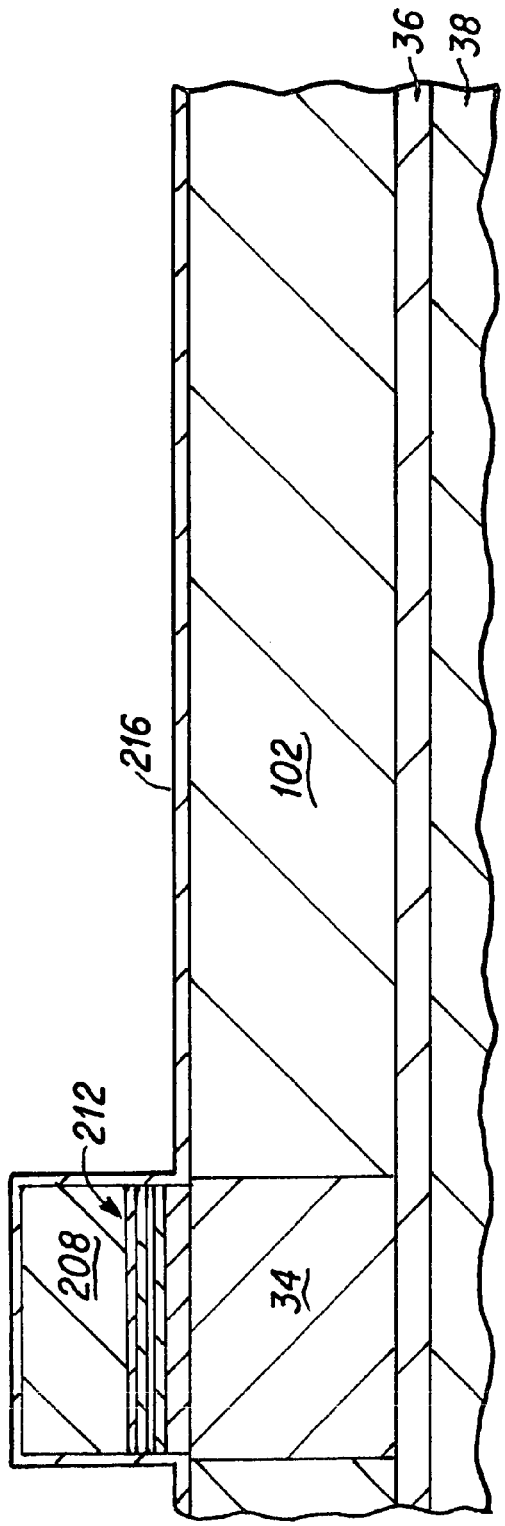
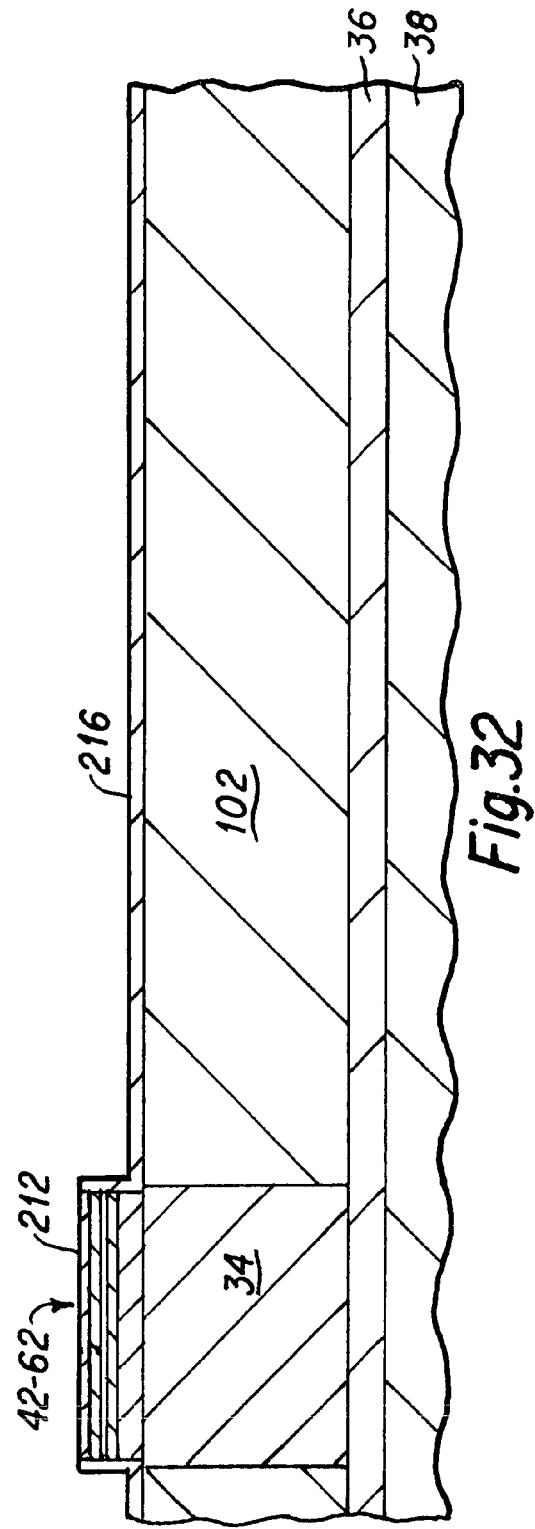

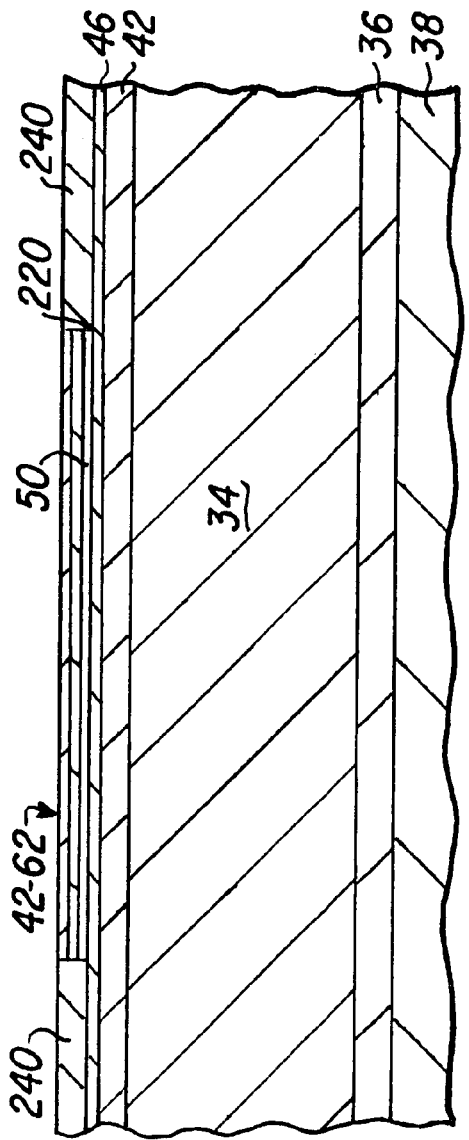
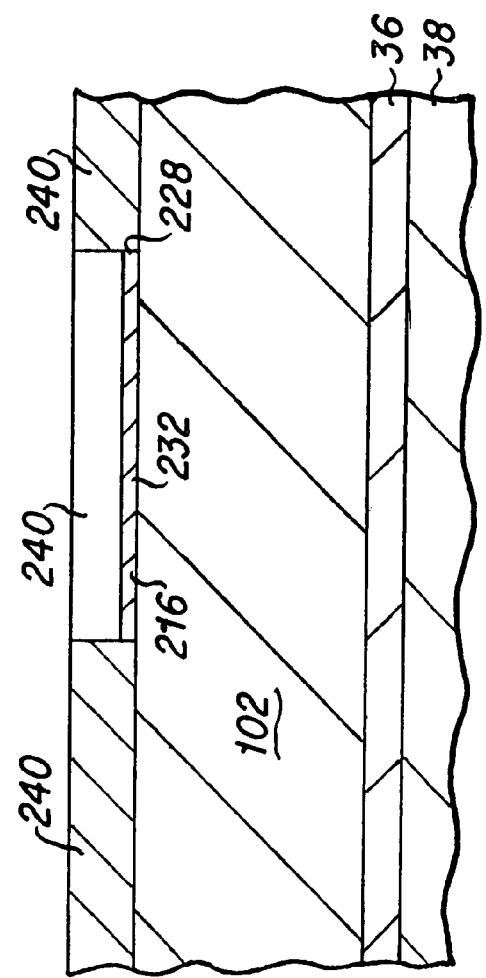
Fig. 37
Fig. 38

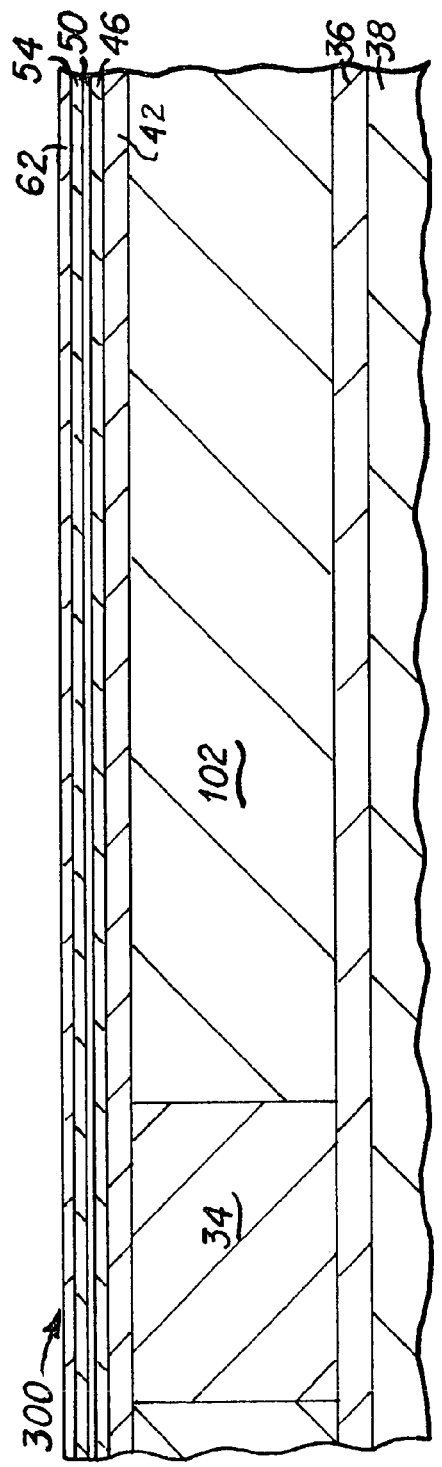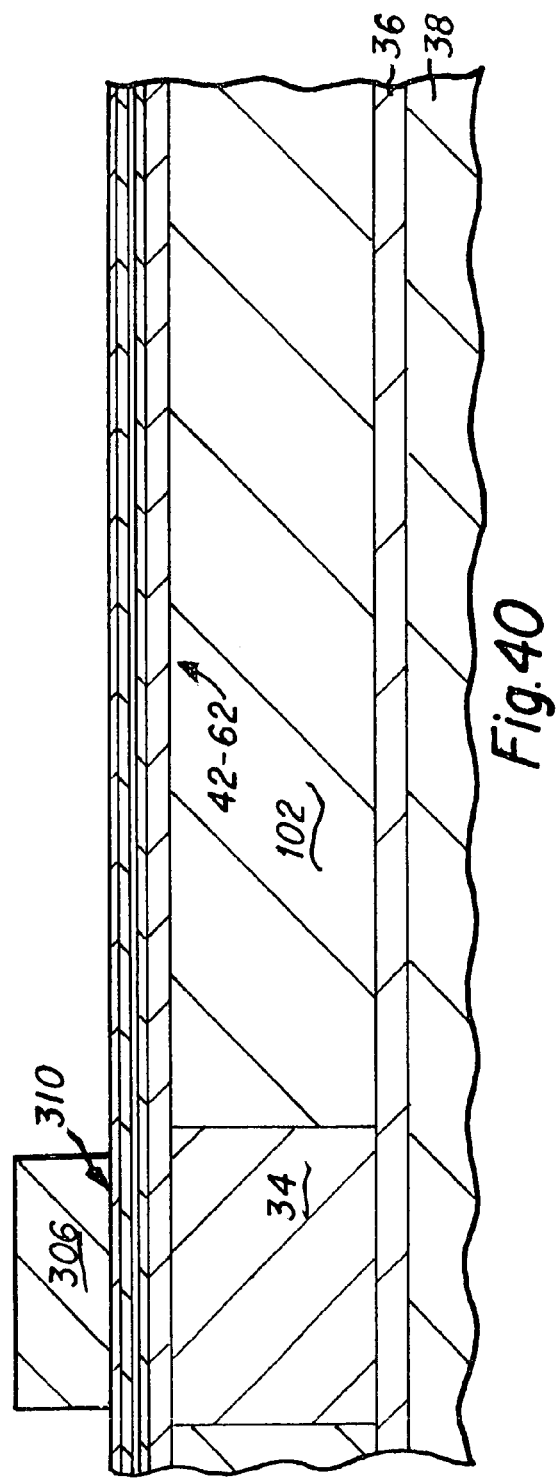

MAGNETIC HEAD HAVING A CPP SENSOR WITH TUNNEL BARRIER LAYER AND ELG MATERIAL COPLANAR WITH THE TUNNEL BARRIER LAYER

BACKGROUND OF THE INVENTION

1. Field of the Invention

The present invention relates generally to the fabrication of magnetic heads for hard disk drives and more particularly to magnetic heads having current perpendicular to plane (CPP) tunnel junction read sensors with at least one ELG and a partially milled stripe height.

2. Description of the Prior Art

A computer disk drive stores and retrieves data by positioning a magnetic read/write head over a rotating magnetic data storage disk. The magnetic head reads data from or writes data to concentric data tracks defined on surface of the disks. The head is fabricated in a structure called a "slider" and the slider flies above the surface of the disk on a thin cushion of air, where the surface of the slider which faces the disk is called an Air Bearing Surface (ABS). The ABS is typically fabricated utilizing lapping techniques that are controlled by electronic lapping guides (ELGs).

Various read head sensors are known in the art and some recent read head structures use a tunnel junction sensor, also known as a "tunnel valve" for reading the magnetic data bit signals from the rotating magnetic data storage disk. The tunnel junction sensor typically includes a nonmagnetic tunnel barrier layer sandwiched between a pinned magnetic layer and a free magnetic layer. The pinned layer in turn is fabricated on an antiferromagnetic (AFM) pinning layer which fixes the magnetic moment of the pinned layer at an angle of 90 degrees to the air bearing surface (ABS). The magnetic moment of the free layer is free to rotate from a quiescent or zero bias point position in response to magnetic field signals from magnetic data bits written on the rotating magnetic disk. The tunnel junction sensor layers are typically disposed between first and second magnetic shield layers, where these first and second shield layers also serve as first and second electrical lead layers for conducting a sensor current through the device. The tunnel junction sensor is thus configured to conduct sensor current perpendicular to the planes (CPP) of the film layers of the sensor, as opposed to previously developed sensors where the sensor current is directed in the planes (CIP) or parallel to film layers of the sensor. The CPP configuration is attracting more attention recently, as it apparently can be made to be more sensitive than the CIP configuration, and thus is more useful in higher data density recording devices.

The read width and the stripe height of the sensor are significant well known parameters that refer to the width of the read head sensor stack and the height dimension of the sensor stack perpendicular to the ABS. Both of these dimensions are very important to the operating characteristics of the read head and they are typically defined using ion milling techniques. A problem that can occur in the fabrication of the prior art CPP sensors is that the ion milling can damage the tunnel barrier layer edges, which can cause unwanted reduction of electrical resistance and even electrical shorting of the tunnel barrier layer. This problem can be solved by the partial milling of the sensor down only through the tunnel barrier layer. However, a second related problem can then arise where the electronic lapping guides (ELGs) are not properly fabricated. That is, where the ELGs are fabricated in the same milling steps as the sensor, the partial milling of the sensor must nevertheless be sufficient to mill completely through a layer of ELG material in order to properly shape it. Specifically, where the back edge of an ELG is created by milling in the same step in which the stripe height of the sensor is milled, the partial milling step (downwardly through the tunnel barrier layer) must be sufficiently robust to mill entirely through the ELG material. In this regard, the selection of ELG material and the thickness of the ELG material are significant parameters that must be properly chosen.

Additionally, in the prior art, the ELG material layer and the sensor layers are not coplanar, and the optimum optical focusing that is utilized to accurately create the milling mask for one layer, such as the tunnel barrier layer, will not be optimum for fabricating the mask for the non-coplanar ELG layer. That is, the optical focusing for the fabrication of an accurate milling mask for the stripe height results in less than fully accurate focusing for the fabrication of the ELG mask because they are located at different focal planes. As a result, there is unwanted variation in the optical focusing for fabricating the ELG mask, which results in unwanted variation in the size of the ELGs. This variation can become significant across the surface of a wafer where there already exists some unwanted variation in the sharpness of optical focusing at different locations across the surface of the wafer, as is well known to those skilled in the art. The significance of variations in the ELG fabrication is that the air bearing surface (ABS) of the individual heads is determined by the electrical properties of the ELGs, and where the size of the ELGs varies across the surface of the wafer, the location of the ABS will similarly vary for magnetic heads disposed at different locations on the wafer. As a result of the differing locations of the ABS of magnetic heads across the surface of the wafer, the sensors of the different magnetic heads will likewise be fabricated with differing properties. Quality control and manufacturing process throughput are adversely affected where the magnetic heads that are fabricated on a single wafer substrate are created with differing properties due to variations in the location of the ABS that is due to variations in the fabrication of the ELGs. Thus, there is a need for a method of sensor fabrication which eliminates damage to the tunnel barrier layer when ion milling is used to shape sensor material stacks, and which accurately shapes the ELGs.

SUMMARY OF THE INVENTION

The present invention includes a magnetic head having a CPP read head sensor. The CPP sensor includes a layered sensor stack including a free magnetic layer, a tunnel barrier layer, a pinned magnetic layer and an antiferromagnetic layer. An ion milling process is used to perform a partial depth material removal to establish the back wall of the sensor stack, where the antiferromagnetic layer is not milled through in creating the back wall of the sensor stack. The location of the back wall of the sensor stack is a factor in determining the stripe height of the sensor. The partial ion milling results in reduced damage to the milled edges of the tunnel barrier layer, and reduces the occurrence of unwanted electrical resistance reduction and electrical shorts across the edges of the tunnel barrier layer. In the fabrication method of the present invention, the layer of ELG material is completely milled through to create the back edge of the ELG in the partial ion milling step that is undertaken to establish the back wall of the sensor. Therefore, when a partial ion milling step is conducted to establish the back wall of the sensor, the ELG material, (specifically its composition and thickness) must be such that the ELG material is milled entirely through during the partial ion milling of the sensor stack.

Photolithographic techniques are utilized to fabricate the milling masks that protect desirable sensor and ELG material during the ion milling. The ELG material layer is desirably deposited at approximately the same optical focusing plane as the tunnel barrier layer, such that sharp, accurate optical focusing is achieved for creating a more accurate milling mask for the ELG back edge fabrication.

It is an advantage of the magnetic head of the present invention that there are reduced instances of electrical short circuits between the free magnetic layer and the pinned magnetic layer of the CPP read sensor.

It is another advantage of the magnetic head of the present invention that the stripe height of the sensor stack is more accurately fabricated.

It is an advantage of a hard disk drive of the present invention that it includes the magnetic head of the present invention having reduced instances of electrical short circuits between the free magnetic layer and the pinned magnetic layer of the CPP read sensor.

It is another advantage of a hard disk drive of the present invention that it includes the magnetic head of the present invention where the stripe height of the sensor stack is more accurately fabricated.

It is an advantage of the method for manufacturing a magnetic head of the present invention that the amount of material removed in the sensor stack milling process is reduced.

It is an another advantage of the method for manufacturing a magnetic head of the present invention that the stripe height of the sensor stack is more accurately fabricated.

It is a further advantage of the method for manufacturing a magnetic head of the present invention that manufacturing yields are improved since there are reduced yield losses due to sensor stripe height fabrication variations.

These and other features and advantages of the present invention will no doubt become apparent to those skilled in the art upon reading the following detailed description which makes reference to the several figures of the drawings.

IN THE DRAWINGS

The following drawings are not made to scale as an actual device, and are provided for illustration of the invention described herein.

FIGS. 4-16 are depictions of prior art sensor fabrication steps;

FIGS. 17-28 are depictions of sensor fabrication steps of a first embodiment of the present invention;

FIGS. 29-38 are depictions of sensor fabrication steps of another embodiment of the present invention;

FIGS. 39-48 are depictions of sensor fabrication steps of yet another embodiment of the present invention.

DETAILED DESCRIPTION OF THE PREFERRED EMBODIMENTS

Figure 1:
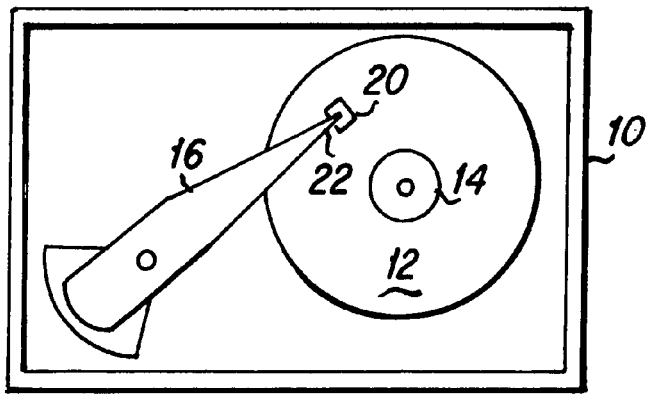
FIG. 1 is a top plan view depicting a hard disk drive of the present invention having a magnetic head of the present invention.

FIG. 1 is a top plan view that depicts significant components of a hard disk drive 10 of the present invention which includes the magnetic head of the present invention. The hard disk drive 10 includes a magnetic hard disk 12 that is rotatably mounted upon a motorized spindle 14. An actuator arm 16 is pivotally mounted within the hard disk drive 10 with a magnetic head 20 of the present invention disposed upon a distal end 22 of the actuator arm 16. A typical hard disk drive 10 may include a plurality of disks 12 that are rotatably mounted upon the spindle 14 and a plurality of actuator arms 16 having a plurality of magnetic heads 20 mounted upon the distal ends 22 of the plurality of the actuator arms 16. As is well known to those skilled in the art, when a hard disk drive is operated, the hard disk 12 rotates upon the spindle 14 and the magnetic head acts as an air bearing slider that is adapted for flying above the surface of the rotating disk. The slider includes a substrate base upon which various layers and structures that form the magnetic head are fabricated. Such heads are fabricated in large quantities upon a wafer substrate and subsequently sliced into discrete magnetic heads.

A typical prior art magnetic head will include both a read head portion and a write head portion. The read head portion is utilized to read data that has been written upon the hard disk 12, and the write head portion is utilized to write data to the disk 12. Prior art read head sensors are generally of two types, current-in-plane (CIP) and current-perpendicular-to-plane (CPP) as is well known to those skilled in the art. The present invention is directed to the read head portion of a magnetic head, and particularly to such read heads that include a CPP sensor, which includes sensors having a tunnel barrier structure, as is next described with aid of FIGS. 2 and 3.

Figure 2:
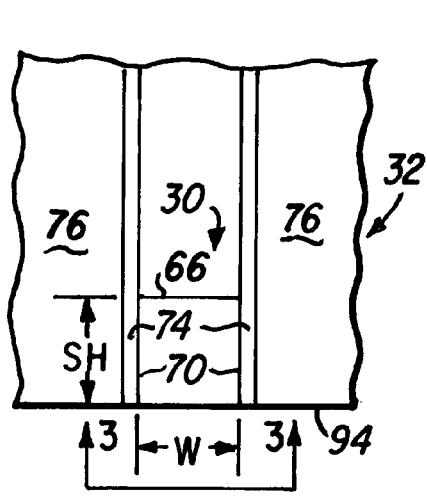
FIG. 2 is a top plan view of a sensor stripe of a CPP read head portion of a prior art magnetic head.
Figure 3:
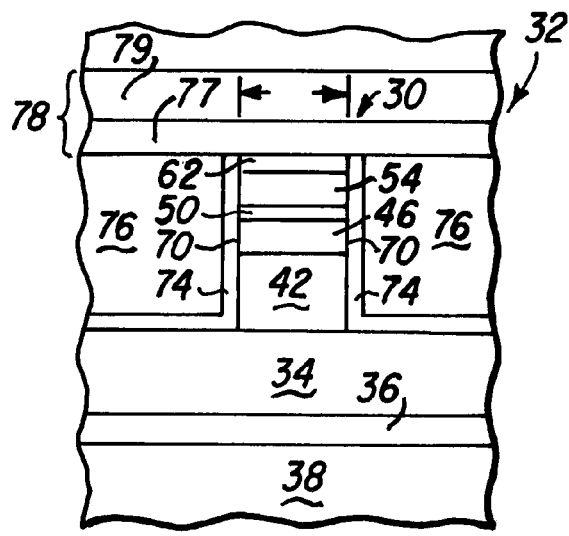
FIG. 3 is a side elevational view of a prior art CPP read sensor, taken from the air bearing surface along lines 3-3 of FIG. 2.

FIG. 2 is a top plan view depicting the tunnel barrier sensor portion 30 of a prior art magnetic read head 32, also known in the art as the read element of the magnetic recording head, and FIG. 3 is a side elevational view of the tunnel barrier sensor 30 depicted in FIG. 2, taken from the air bearing surface of the magnetic read head 32 along lines 3-3 of FIG. 2. As depicted therein, the tunnel barrier sensor 30 includes a plurality of thin film layers. These layers include a first magnetic shield layer 34 that is fabricated upon an electrical insulation layer 36 that is deposited upon a wafer substrate 38. While many different layered tunnel barrier sensor structures are known in the prior art, a typical sensor layer structure will include an antiferromagnetic layer 42, which may be comprised to of a Pt—Mn alloy, that is fabricated upon the first magnetic shield layer 34. A pinned magnetic layer 46 is fabricated upon the antiferromagnetic layer 42, and it may be comprised of a magnetic material such as a Co—Fe alloy. Thereafter, a tunnel barrier layer 50 is fabricated upon the pinned magnetic layer 46, where the tunnel barrier layer 50 is composed of an electrical insulation material such as oxides of Mg, Ti or Al; $MgO_x$, $TiO_x$ or $AlO_x$ where the subscript x indicated that the oxide need not be stoichiometric. A free magnetic layer 54 is then fabricated upon the tunnel barrier layer 50, where the free magnetic layer 54 may be composed of a magnetic material such as a Co—Fe alloy or a Ni—Fe alloy. Thereafter, a cap layer 62 is typically fabricated upon the free magnetic layer 54, and a typical cap layer may be comprised of a material such as tantalum. The layers 42-62 are then masked and ion milled in a plurality of steps to create a central sensor stack having a back wall 66 and side walls 70. As seen in the top plan view of FIG. 2, the distance W between the side walls 70 of the sensor 30 defines the read width of the sensor. In fabricating the sensor structure 30, the back edge 66 of the sensor layer is typically established prior to the fabrication of the side edges 70.

Following the ion milling steps for creating the back edge 66 and side edges 70, a thin layer of electrical insulation 74 is next deposited upon the device, including the side edges 70. Thereafter, magnetic hard bias elements 76, typically composed of a material such as a Co—Pt—Cr alloy, are fabricated upon the insulation layer 74 proximate the side edges 70. A second magnetic shield structure 78, which may typically include a nonmagnetic material layer 77 and a magnetic material layer 79, is then fabricated upon the cap layer 62 and hard bias elements 76. In fabricating the magnetic read head 32, following the fabrication of the read head structures, and following subsequent fabrication steps to create write head structures (not shown), an air bearing surface (ABS) 94 is created. The distance between the ABS 94 and the back edge 66 is termed the stripe height (SH) of the sensor.

A magnetic head including a tunnel barrier sensor 30 operates by the passage of electrical sensor current from the first magnetic shield 34, through the sensor layers 42-62 and into the second magnetic shield structure 78, such that the current travels perpendicularly to the planes (CPP) of the layers 42-62. The electrical insulation layer 74 serves to guide the sensor current through the sensor layers. The electrical properties of the tunnel barrier sensor are primarily a function of the material, area and thickness of the tunnel barrier layer 50, where the tunnel barrier layer area is determined by the product of the read width (W) and the stripe height (SH). The electrical resistance of the tunnel barrier layer material 50 primarily controls the electrical resistance of the sensor 30, as the other layers of the sensor 30 are comprised of low resistance metallic materials. That is, the tunnel barrier layer material is comprised of an electrical insulator such as $MgO_x$, $TiO_x$ or $AlO_x$, and the layer 50 is sufficiently thin (approximately 1 nanometer) that electrons carrying the sensor electrical current can tunnel through it. Accurate fabrication of the stripe height (SH) is therefore important to the proper operation of the sensor, and two significant factors in establishing the stripe height are the accuracy of the milling mask location to create the back edge of the sensor, and the accuracy of the final lapping and polishing steps that create the ABS, because the stripe height is the distance between the sensor back edge and the ABS at the front edge of the sensor. The accurate fabrication of the ABS is directly related to the accurate fabrication of the electronic lapping guides (ELGs) that are created during the sensor fabrication process, as is well known to those skilled in the art. The operational characteristics of tunnel barrier sensors are well known to those skilled in the art, and a more detailed description thereof is not deemed necessary in order to fully describe the features of the present invention.

A problem of undesirable electrical resistance reduction and even electrical shorting of tunnel barrier sensors has arisen in CPP sensor read heads, and the problem is apparently due to damage that occurs to the edges of the tunnel barrier layer when the sensor back edge 66 and side edges 70 are created. A solution to this problem is to just partially mill the back edge and side edges of the sensor down through the tunnel barrier layer. The reduced ion milling (by a factor of perhaps 10 over the prior art) reduces the damage to the tunnel barrier edges and ameliorates the reduced resistance and shorting problems. However, the ELGs (not shown in FIGS. 2 and 3, but described in detail below) are also being fabricated in the same back edge ion milling step, and they must be fabricated such that the partial milling of the back edge of the sensor is sufficient to fully mill away the ELG material. In order to more fully understand the nature of these problems, and the features of the present invention which alleviate these problems, a more detailed description of the fabrication steps of the prior art sensor 30 is next presented. The novel features of the present invention are thereafter described.

Figure 4:
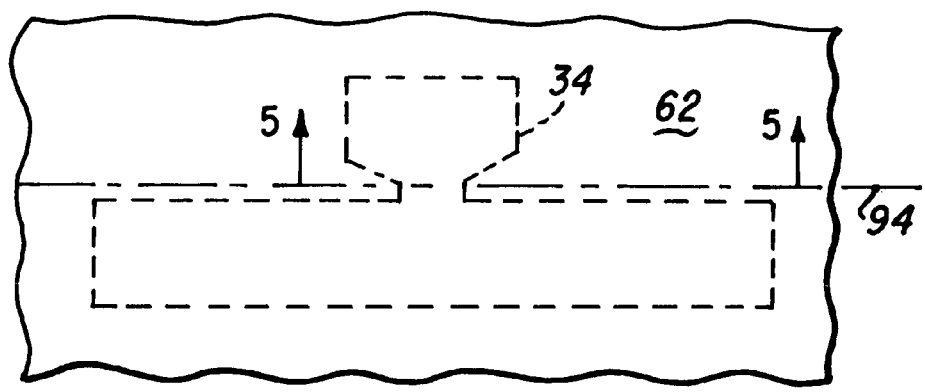
Figure 5:
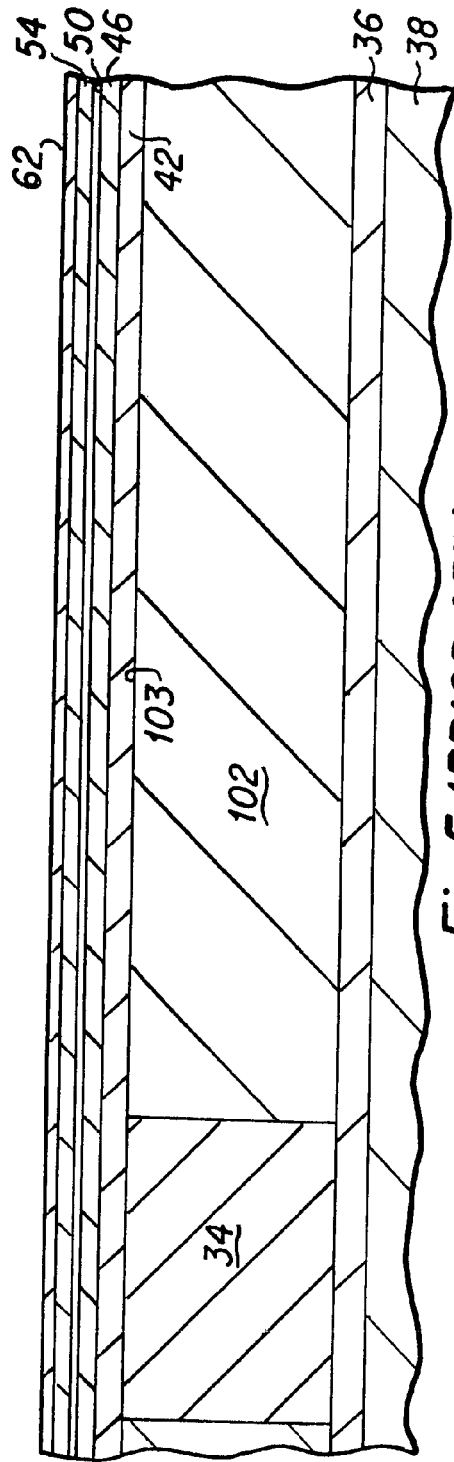

Referring to the top plan view of FIG. 4 and the side cross-sectional view of FIG. 5, in a first series of fabrication steps of the prior art tunnel barrier sensor 30, the insulation layer 36 is deposited upon the wafer substrate 38 and the first magnetic shield 34 is fabricated upon the insulation layer 36. The shield is typically fabricated utilizing photolithographic and electroplating techniques. Following the electroplating of the first magnetic shield, alumina fill 102 is deposited and the surface 103 is chemically mechanically polished (CMP). Thereafter, the series of sensor layers 42-62, including the antiferromagnetic layer 42, pinned magnetic layer 46, tunnel barrier layer 50, free magnetic layer 54, and cap layer 62 are deposited sequentially across the surface 103 of the wafer.

Figure 6:
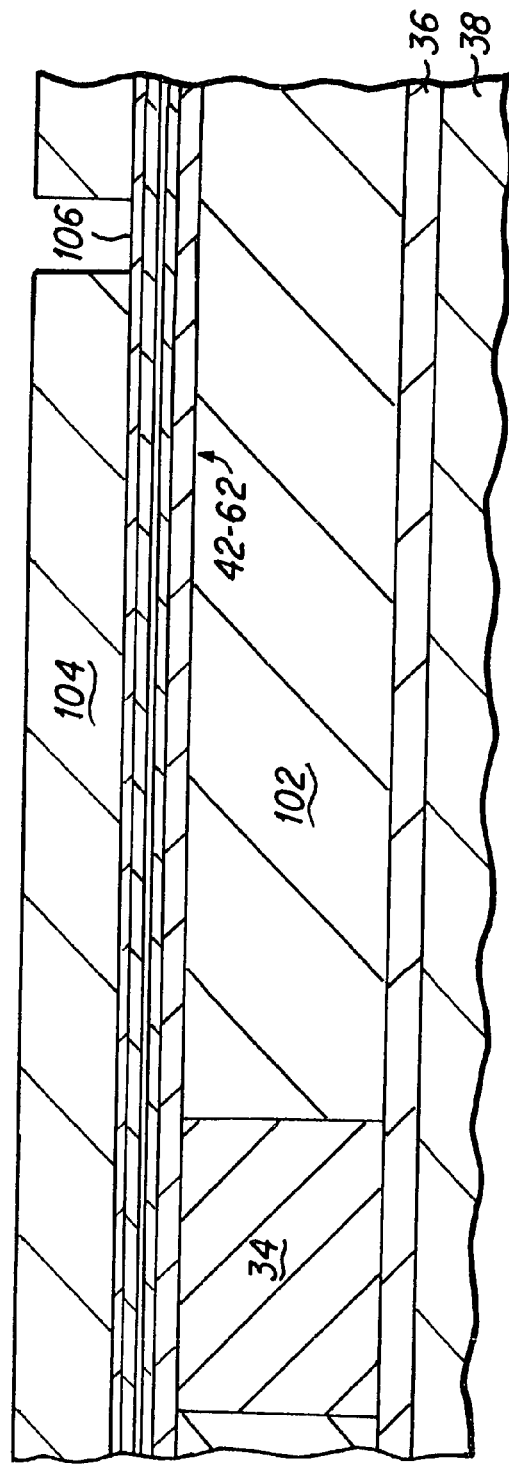

Thereafter, as depicted in FIG. 6, a first milling mask 104 is fabricated upon the sensor layers. The mask covers the wafer surface except for small areas 106 where the ELGs are to be located. Thereafter, as depicted in FIG. 7 a layer of ELG material 108, such as NiFe, is deposited across the wafer surface. Following the ELG material deposition, the mask 104 with ELG material 108 thereon is removed, such as by use of a chemical stripper in a lift-off process, and the resulting sensor fabrication stage is depicted in FIG. 8. A significant, undesirable feature of the magnetic head of FIG. 8 is that the top surface 110 of the ELG material 108 that is disposed upon the surface 103 of the refill material 102 is located in a different optical plane from the top surface 64 of the sensor layers 42-62.

In the next fabrication steps, as depicted in FIGS. 9 and 10, unwanted sensor layer material is removed. To accomplish this, as shown in FIG. 9, a milling mask 112 that protects the desired sensor material 42-62 and ELG material 108 is fabricated upon the surface of the wafer. Thereafter, as shown in FIG. 10, the unmasked sensor material and ELG material is milled away and alumina fill 116 is then deposited across the wafer surface. The milling mask 112 is then removed, and the resulting sensor fabrication stage is depicted in FIG. 10.

Figure 11:
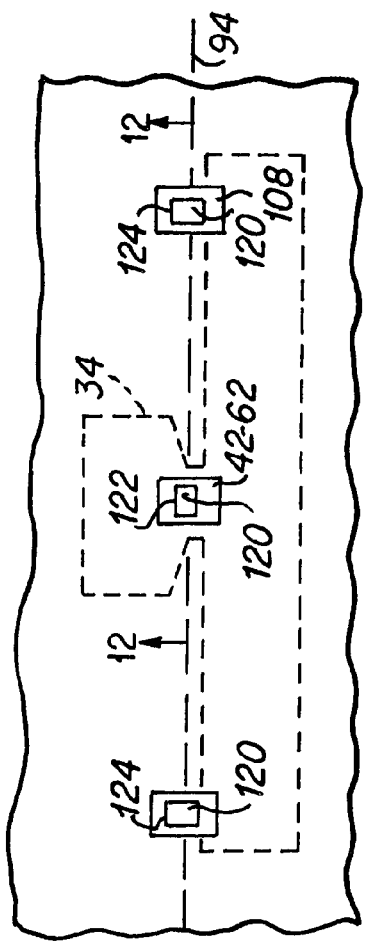
Figure 12:
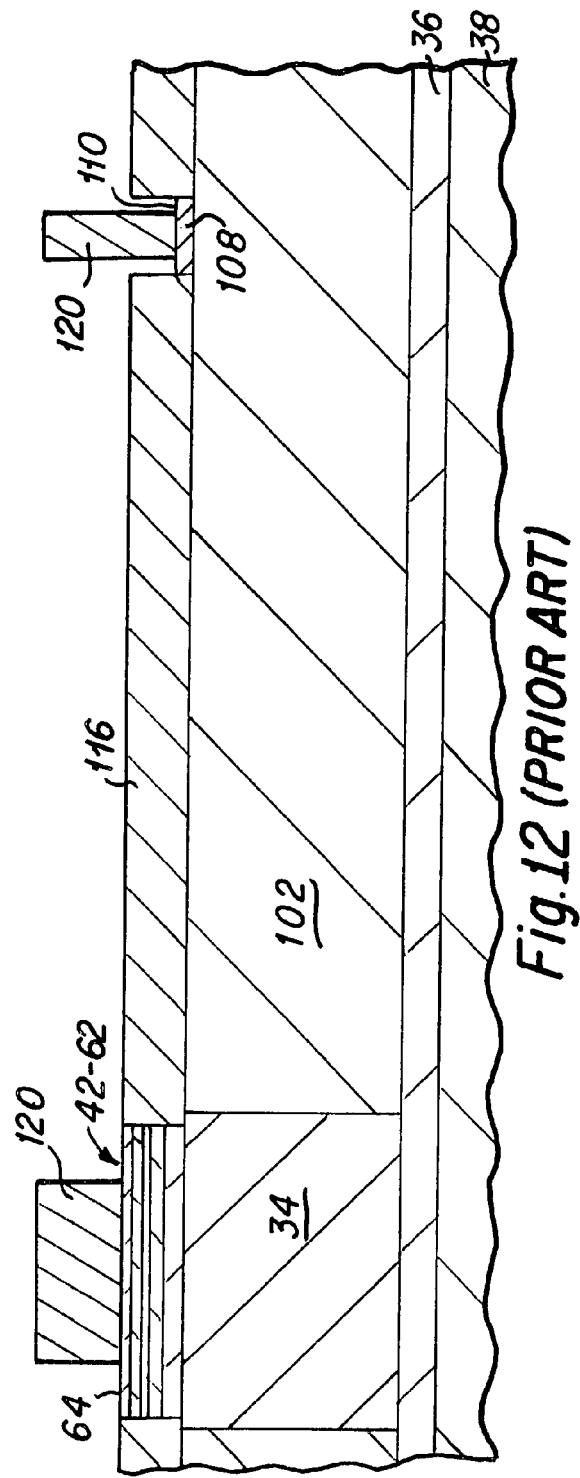

As is next depicted in the top plan view of FIG. 11 and the side cross-sectional view of FIG. 12, where FIG. 12 is taken at the ABS along lines 12-12 of FIG. 11, a back edge milling mask 120 is next fabricated upon the sensor layers 42-62 and ELG material 108. This milling mask 120 is fabricated utilizing photolithographic techniques in which a photoresist layer is fabricated and patterned across the surface of the wafer. Thereafter, utilizing optical imaging techniques, an image of the photomask is optically focused upon the wafer to define the shape of the milling mask 120 by exposing the photoresist, which is subsequently hardened at desired locations. At this fabrication step the significant locations for accurate mask fabrication are at the back edge 66 of the sensor stack 42-62 and the back edges 124 of the ELGs. Following the exposure of the photoresist, unexposed photoresist is removed to create the milling mask 120, termed the stripe height milling mask 120 herein. The stripe height milling mask 120 is thus formed with a sensor stripe height mask back edge 122 and an ELG mask back edge 124.

Figure 13:
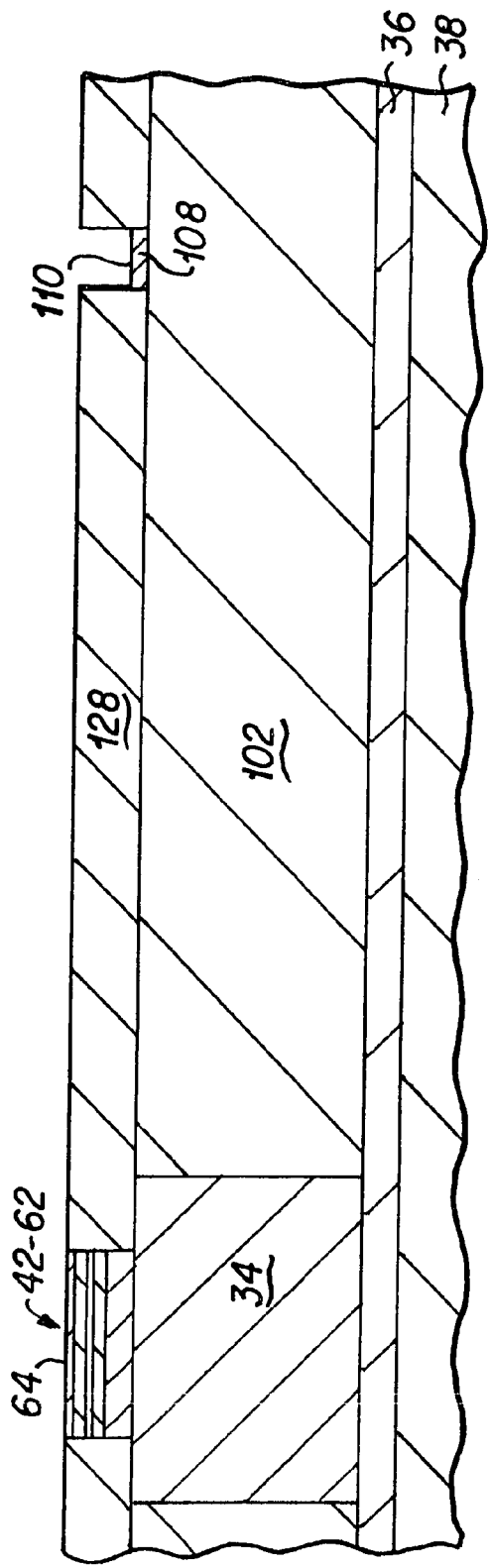
Figure 14:
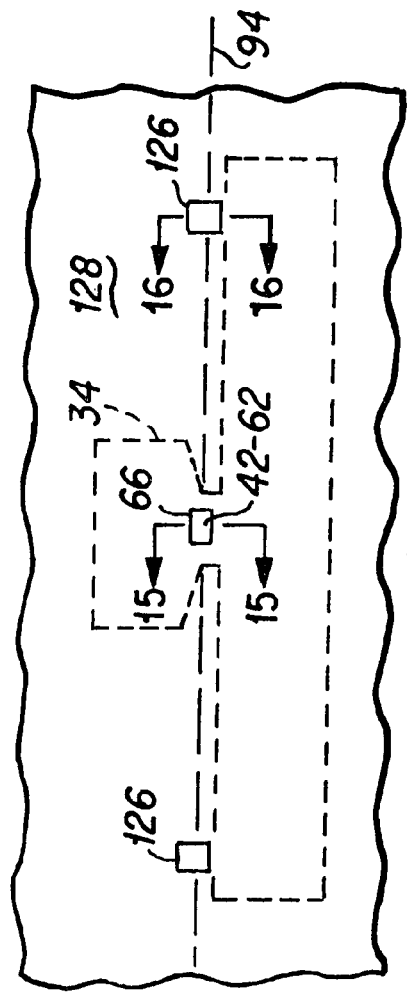
Figure 15:
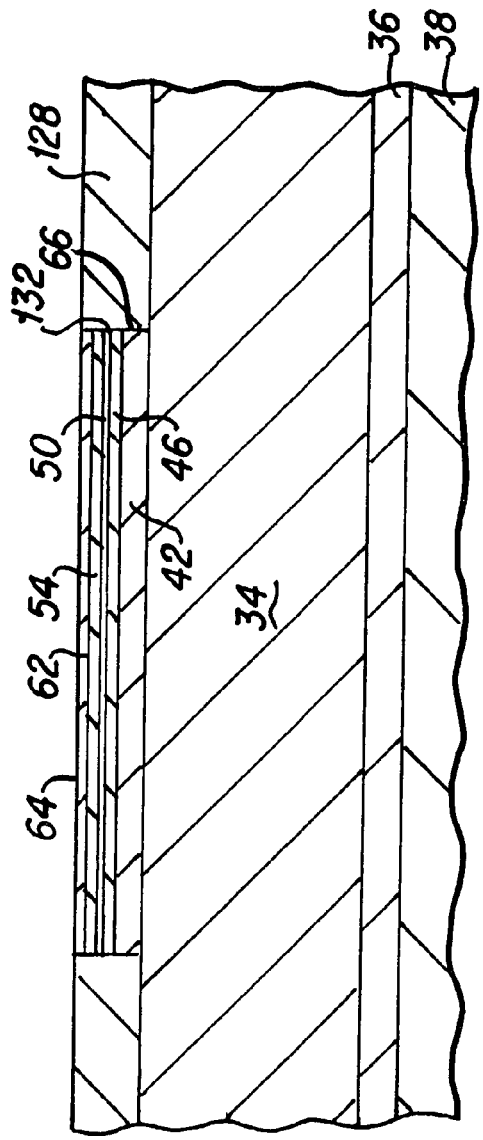
Figure 16:
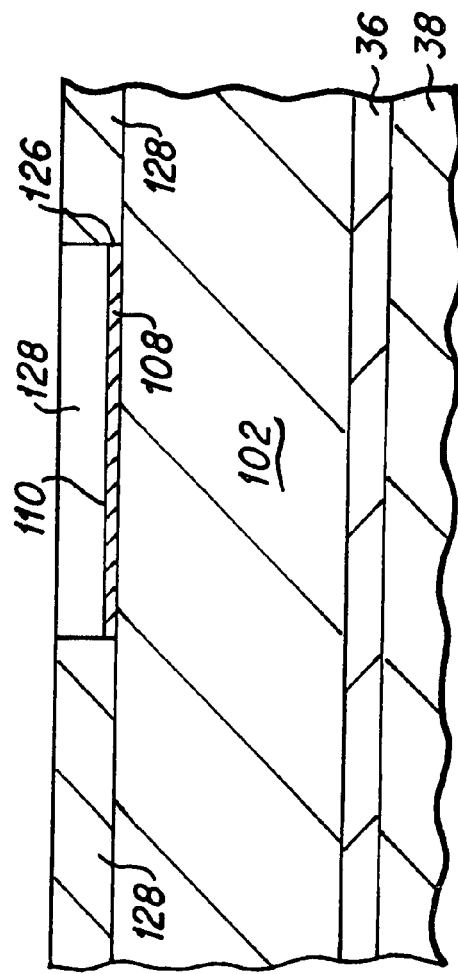

Following the fabrication of the stripe height milling mask 120, an ion milling step is performed in which the unmasked sensor layers of the sensor stack 42-62 are milled away down to the first magnetic shield layer 34 to create the back edge 66 of the sensor stack, as is depicted in FIG. 15. Simultaneously, the unmasked portions of the ELG material 108 are milled away, such that a back edge 126 of the ELGs is created, as is depicted in FIG. 16. Thereafter, while the stripe height milling mask 120 is still in place, further alumina fill 128 is deposited to refill areas of the wafer at which material was removed during the stripe height ion milling step. Following the alumina refill, the stripe height milling mask 120 is removed, such as through the use of chemical strippers in a lift-off process, and the resulting fabrication stage is depicted in FIGS. 13, 14, 15 and 16, in which FIG. 13 is a cross-sectional view, FIG. 14 is a top plan view, FIG. 15 is a cross-sectional view taken along lines 15-15 of FIG. 14 and FIG. 16 is a cross-sectional view taken along lines 16-16 of FIG. 14.

It is therefore to be understood that in the prior art stripe height milling step that the back edges of both the sensor stack and the ELGs are fabricated. Significantly, the accurate fabrication of both the sensor stack back edge 66 and the ELG back edges 126 are the goal of the present invention, as is described in detail below.

Following the stripe height milling step, as described hereabove, a further milling mask (not shown) is fabricated to establish the read width of the sensor stack and the sides of the ELGs; thereafter further fabrication steps are undertaken to complete the fabrication of the magnetic head. These steps are well known to those skilled in the art and a detailed description of the steps is not deemed necessary in order to provide a complete description of the present invention.

A principal cause of the tunnel barrier electrical resistance reduction and shorting problem is initially created during this stripe height ion milling step. Particularly, the prolonged exposure of the back edge 132 (see FIG. 15) of the tunnel barrier layer 50 to the ion milling process that includes the milling of the pinned magnetic layer 46 and the antiferromagnetic layer 42 results in an alteration of the electrical resistance of the tunnel barrier layer 50 at its back edge 132. That is, the electrical resistance at the milled back edge 132 of the tunnel barrier layer 50 may become significantly reduced, and even electrically shorted during the prolonged ion milling process, as it is performed to remove the pinned magnetic layer 46 and the antiferromagnetic layer 42. As is described herebelow, in the present invention the ion milling of the sensor stack back edge 66 is reduced in depth and time duration (termed partial ion milling), and the alteration of the back edge 132 of the tunnel barrier layer 50 is significantly reduced; also, significantly, the back edges 126 of the ELGs 108 are simultaneously fabricated in this same partial ion milling step.

Figure 17:
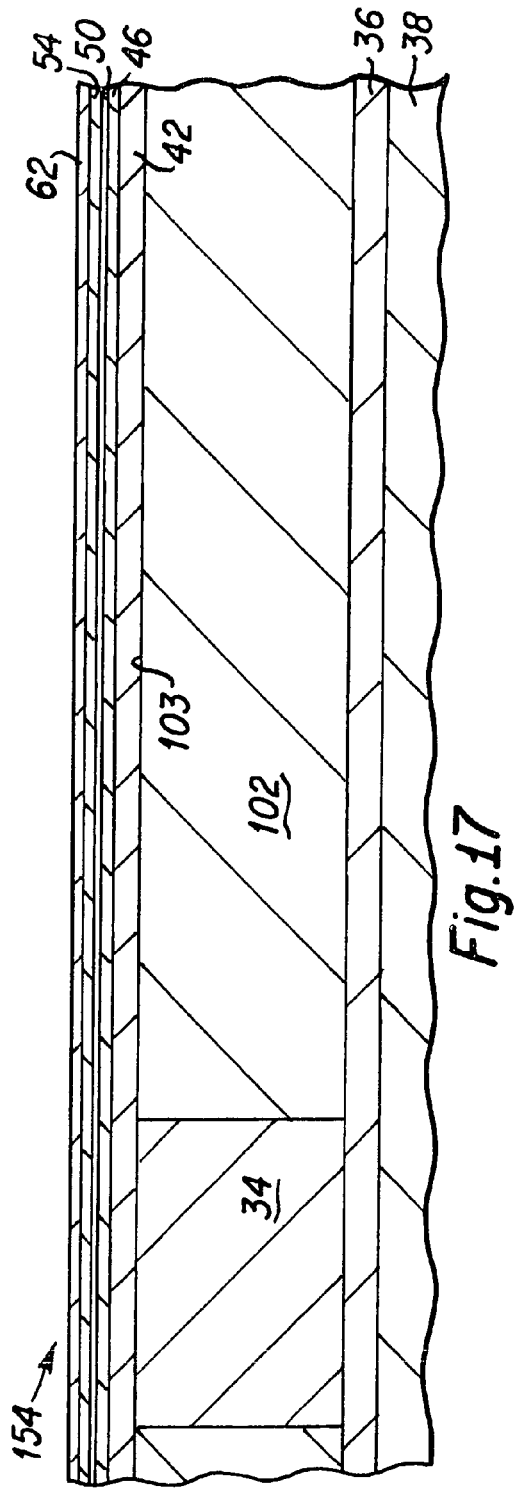

A partial ion milled sensor is next described wherein the improved ELG fabrication method of the present invention can be better understood. The initial fabrication steps for the tunnel barrier sensor of a magnetic read head 154 of the present invention (which may serve as the read head portion of a magnetic head 20 in a disk drive 10) are similar to those of the prior art and similar structures identically numbered for ease of comprehension. Particularly, as depicted in FIG. 17, which is identical to FIG. 5, the first magnetic shield 34 is fabricated upon the insulation layer 36 that is deposited upon the wafer substrate 38. Thereafter, the sensor layers, which may include an antiferromagnetic layer 42, a pinned magnetic layer 46, tunnel barrier layer 50, free magnetic layer 54, and cap layer 62 are deposited across the surface of the wafer.

Figure 18:
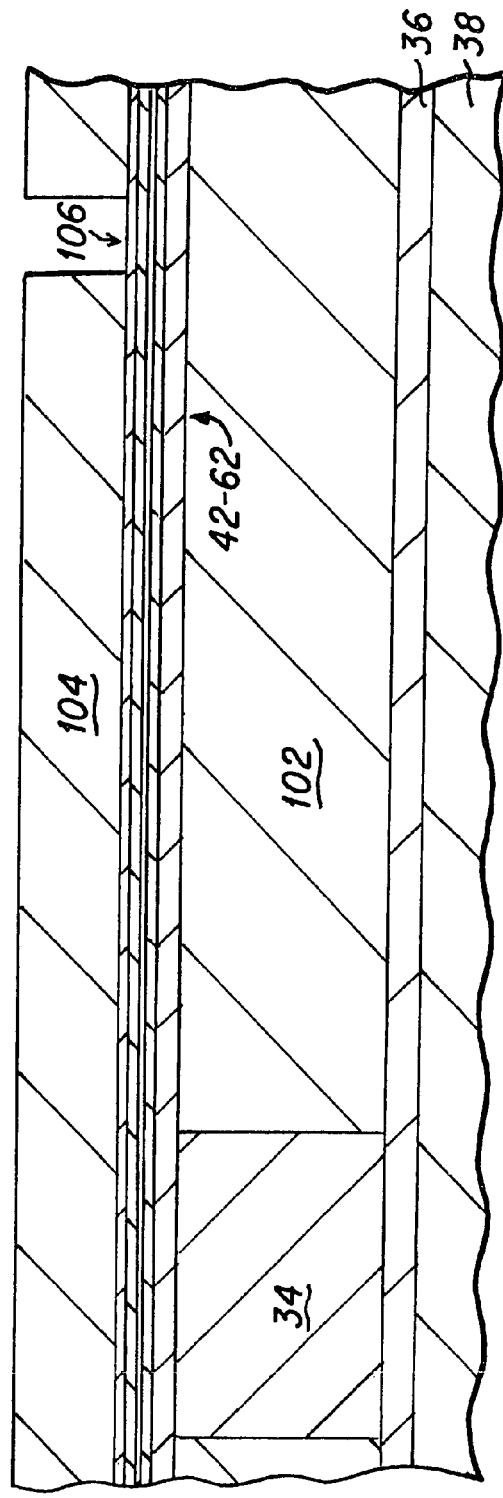

Thereafter, as depicted in FIGS. 18 and 19 (which are identical to FIGS. 6 and 7), the first milling mask 104 is fabricated upon the sensor layers. The mask 104 covers the wafer surface except for small areas 106 where the ELGs are to be located. Thereafter, a layer of ELG material 108 is deposited across the wafer surface. Following the ELG material deposition, the mask 104 is removed, such as by use of a chemical stripper in a lift-off process, and the resulting sensor fabrication stage is depicted in FIG. 20. A significant, undesirable feature of the magnetic read head of FIG. 20 is that the top surface 110 of the ELG material 108 that is disposed upon the refill material 102 is located in a different optical image plane than the image plane at the top surface 64 of the sensor stack 42-62. This problem is addressed by the present invention, as is described herebelow.

In the next fabrication step, as depicted in FIGS. 21 and 22 (which are identical to FIGS. 9 and 10), unwanted sensor layer material is removed. To accomplish this, the milling mask 112 that protects the desired sensor material 42-62 and ELG material 108 is fabricated upon the surface of the wafer. Thereafter, the unmasked sensor material and ELG material is milled away and an alumina fill layer 116 is then deposited across the wafer surface. The milling mask 112 is then removed, and the resulting sensor fabrication stage is depicted in FIG. 22.

Figure 23:
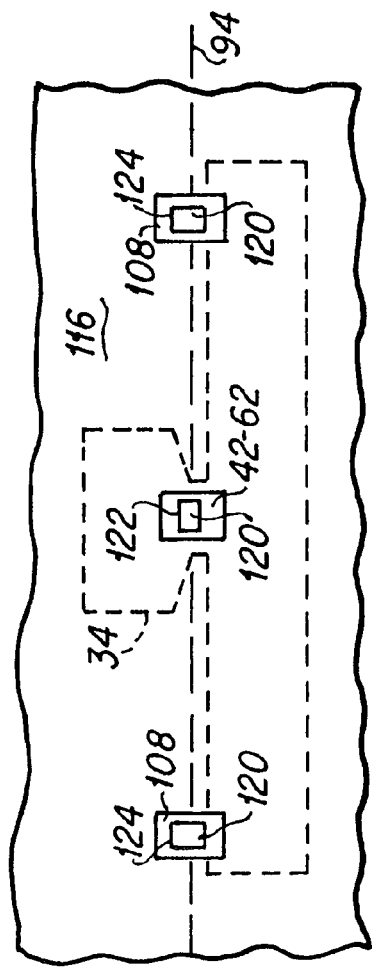
Figure 24:
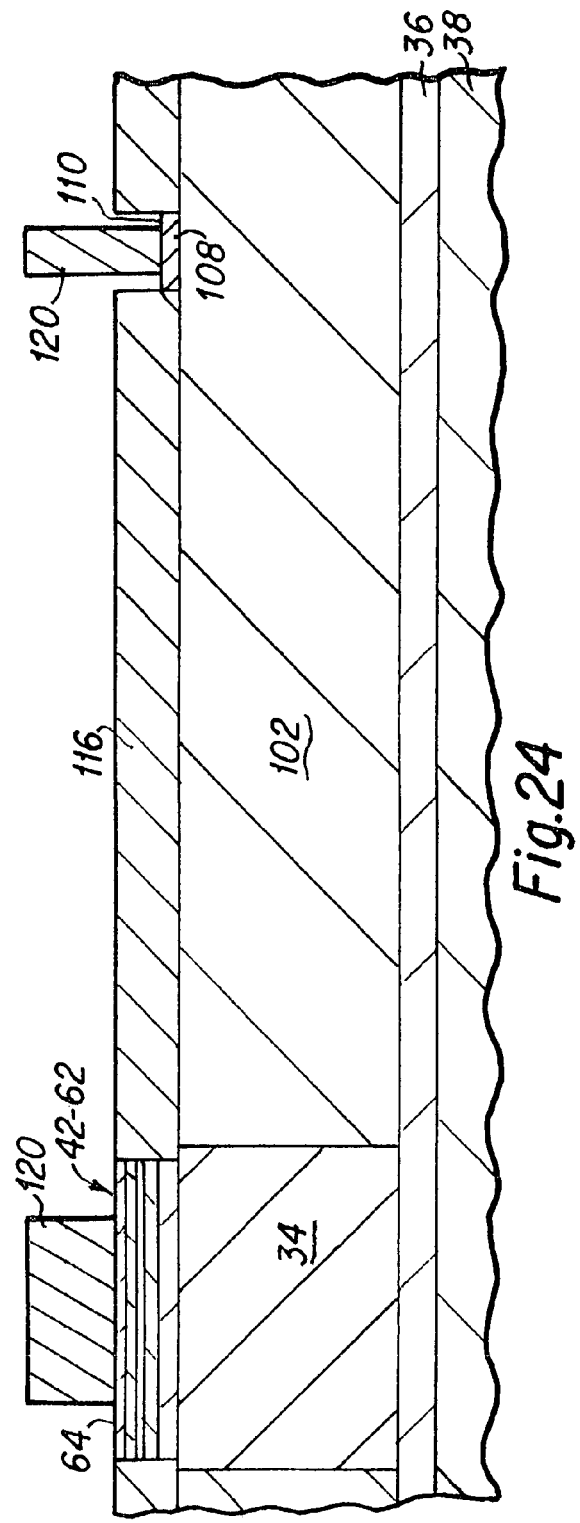
Figure 25:
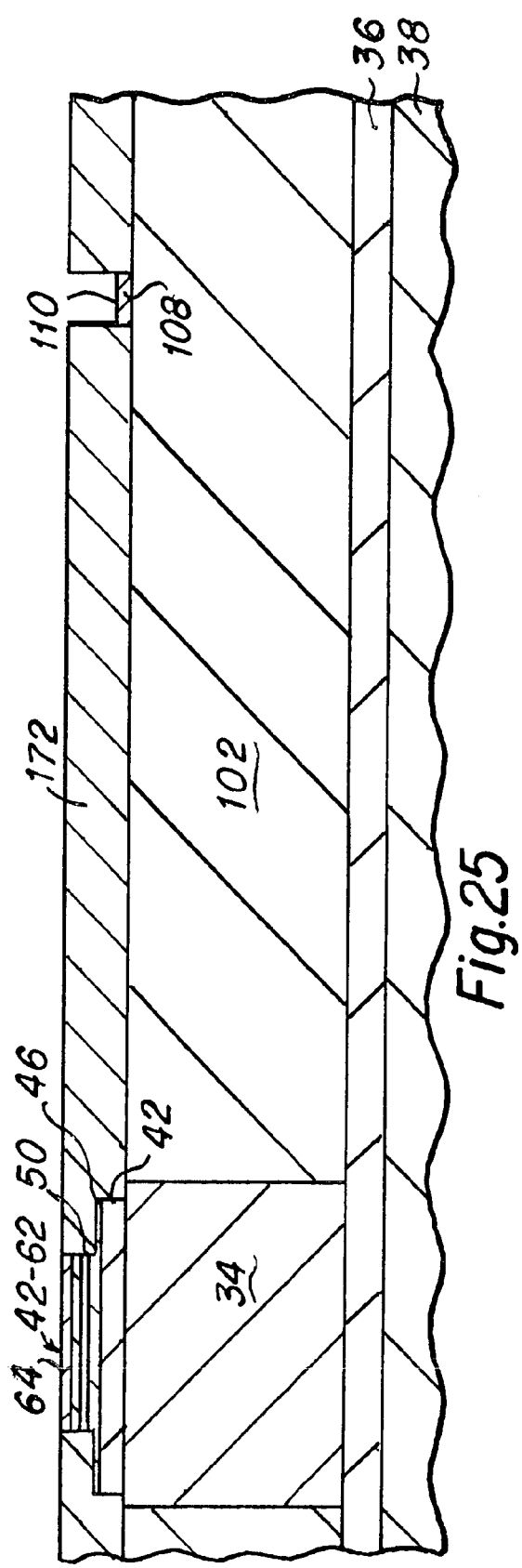
Figure 26:
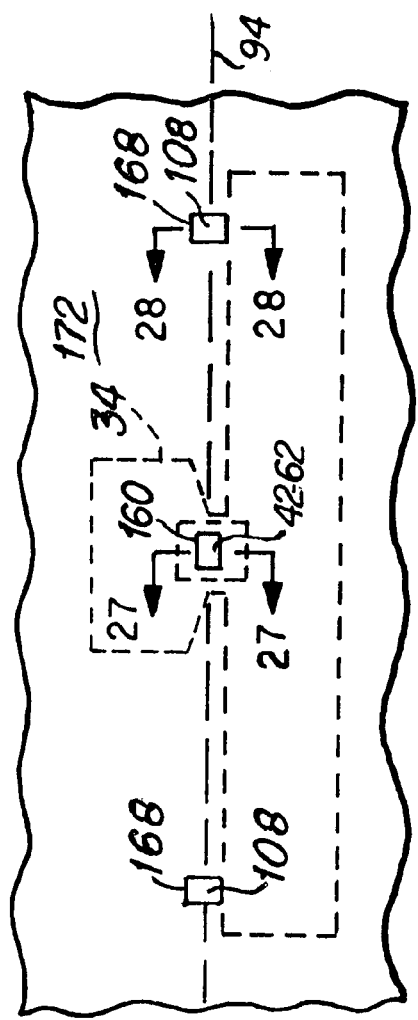
Figure 27:
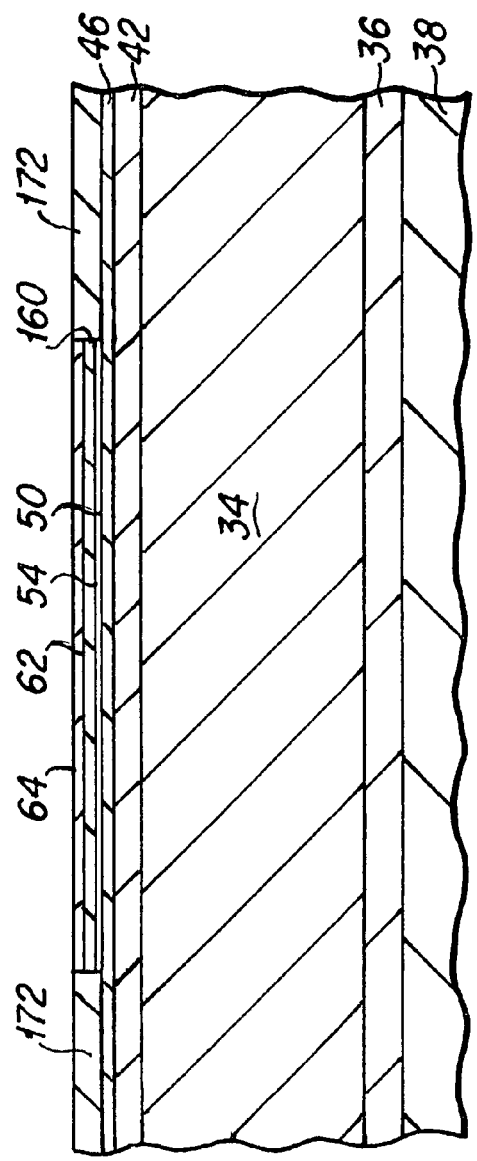
Figure 28:
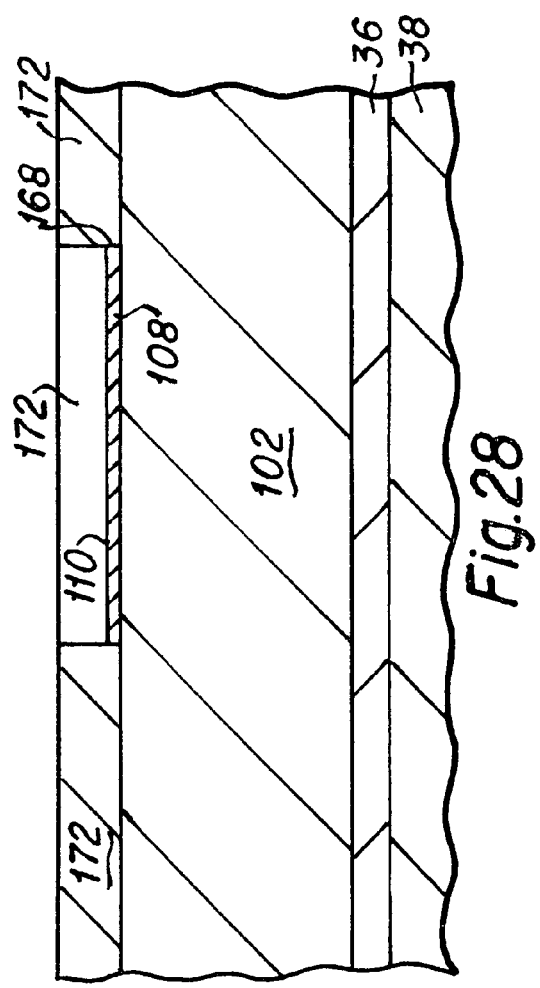

As is next depicted in the top plan view of FIG. 23 and the side cross-sectional view of FIG. 24 (which are identical to FIGS. 11 and 12), the stripe height milling mask 120 is next fabricated upon the sensor layers 42-62 and ELG material 108. This milling mask 120 is formed utilizing photolithographic techniques in which a photoresist layer is fabricated and patterned across the surface of the wafer. Thereafter, utilizing optical imaging techniques, an image of a photomask is optically focused upon the wafer to define the shape of the milling mask 120 by exposing the photoresist which is subsequently hardened at desired locations. At this fabrication step the significant locations for accurate mask fabrication are at the back edge 122 of the sensor stack and the back edges 124 of the ELGs. Following the exposure of the photoresist, unexposed photoresist is removed to create the stripe height milling mask 120, as has been described above; and further fabrication steps are depicted in FIGS. 25-28, in which FIG. 25 is a cross-sectional view, FIG. 26 is a top plan view, FIG. 27 is a cross-sectional view taken along lines 27-27 of FIG. 26 and FIG. 28 is a cross-sectional view taken along lines 28-28 of FIG. 26. Following the fabrication of the stripe height milling mask 120, a partial ion milling step is performed in which the unmasked sensor layers are milled away down through the tunnel barrier layer 50 to create the back edge 160 of the sensor, as is depicted in FIG. 27. Simultaneously, the unmasked portions of the ELG material layer are milled away, such that the back edge 168 of the ELGs is created, as is depicted in FIG. 28. Thereafter, while the stripe height milling mask is still in place, further alumina fill 172 is deposited to refill areas of the wafer at which material was removed during the stripe height partial ion milling step. Following the alumina refill, the stripe height milling mask is removed, such as through the use of chemical strippers in a lift-off process, and the resulting fabrication stage is depicted in FIGS. 25, 26, 27 and 28.

As depicted in FIG. 28, the entire layer of ELG material 108 must be completely milled through in the partial ion milling step, such that the back edge 160 of the sensor stack and the back edge 168 of the ELG 108 are simultaneously created in the same partial ion milling step. In order to accomplish this, the thickness of the ELG material and its composition must be such that it is completely milled through during the partial ion milling step. A suitable ELG material for this application is a tantalum adhesion layer with a rhodium conductive layer formed thereon (Ta/Rh), where the tantalum layer has a thickness of approximately 20 Å and the rhodium layer has a thickness range of from approximately 50 Å to approximately 150 Å. Other materials such as gold may also prove effective.

Significantly, as can be best seen in the side elevational view of FIG. 25, the top surface 110 of the ELG material layer 108 is disposed at a different layer height than the tunnel barrier layer 50 of the sensor stack 42-62. This creates a less than optimal configuration for the accurate fabrication of the back edge 168 of the ELGs. This is because the photolithographic techniques that are utilized to fabricate the stripe height milling mask 120 are optimized to focus the image of the photomask in the plane 64 at the top of the sensor stack 42-62. Therefore, at the plane 110 at the top of the ELGs, the focusing of the image of the photomask used to define the milling mask 120 is not as sharp, and there is some deviation in the location of the back edge 124 of the milling mask 120 at the ELG from its desired location relative to the back edge 122 of the milling mask 120 at the sensor stack 42-62. As a result of the undesirable deviation in the fabrication of the back edge 124 of the milling mask 120 at the ELG, there is a corresponding unwanted variation in the location of the back edge 168 of the ELGs 108 following the partial ion milling step. This unwanted deviation in the fabricated location of the back edge 168 of the ELGs 108 can vary significantly at differing locations across the surface of an entire wafer upon which hundreds of magnetic heads are simultaneously fabricated. The ultimate result is an unwanted variation in location of the back edge 168 of the ELGs that is manifested when the air bearing surface of the magnetic heads is created. Specifically, the variations in the back edge 168 of the ELGs 108 acts to create a corresponding variation in the location of the air bearing surface of various magnetic heads across the wafer surface, because the ELGs are used to control the lapping process that creates the ABS. This ultimately results in a corresponding variation of the stripe height of the sensor stack 42-62, and particularly the tunnel barrier layer 50 portion thereof, where the stripe height is the distance between the ABS and the back edge 160 of the tunnel barrier layer. Ultimately, this unwanted variation in the location of the ELG back edge 168 results in a corresponding unwanted variation in the properties of the sensor of magnetic heads that are fabricated at different points across the surface of the wafer. To resolve this problem a further embodiment 300 of the present invention is later described.

An improved magnetic read head 200 embodiment of the present invention that includes a reduction in the number of fabrication steps is next presented, and magnetic head 200 may serve as a head 20 in the disk drive 10. The initial fabrication steps for the tunnel barrier sensor of the magnetic read head 200 of the present invention are similar to those of the magnetic read head embodiment 154, and similar structures are identically numbered for ease of comprehension. Particularly, as depicted in FIG. 29 which is identical to FIGS. 5 and 17, the first magnetic shield 34 is fabricated upon the insulation layer 36 that is deposited upon the wafer substrate 38. Thereafter, the sensor layers, which may include an antiferromagnetic layer 42, a pinned magnetic layer 46, tunnel barrier layer 50, free magnetic layer 54, and cap layer 62 are deposited across the surface of the wafer. Thereafter, as depicted in FIG. 30, a first milling mask 208 is fabricated upon the sensor layers. Unlike the first milling mask 104 depicted in FIGS. 6 and 7 and 18 and 19, the first milling mask 208 covers just an enlarged central area 212 of the sensor layers 42-62, such that field areas of the sensor layers are uncovered. Thereafter, as depicted in FIG. 31, ion milling is conducted to remove the uncovered sensor layers. Thereafter, ELG material 216 is deposited across the surface of the wafer and the first milling mask 208 is subsequently removed, as is depicted in FIG. 32.

Figure 33:
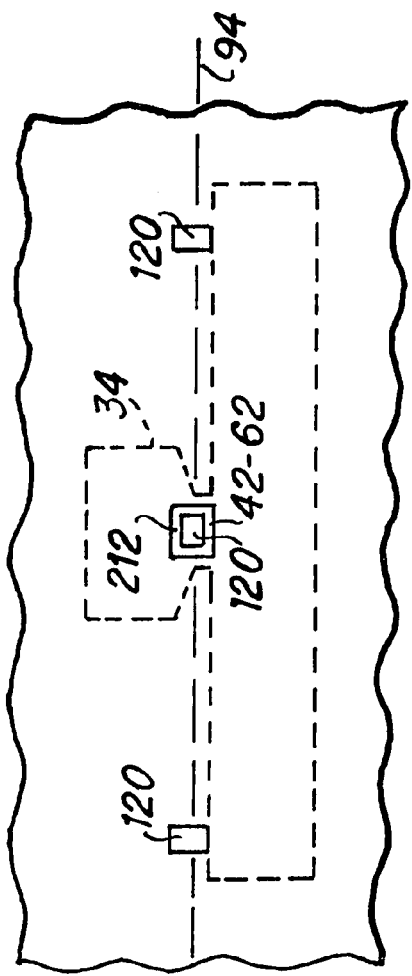
Figure 34:
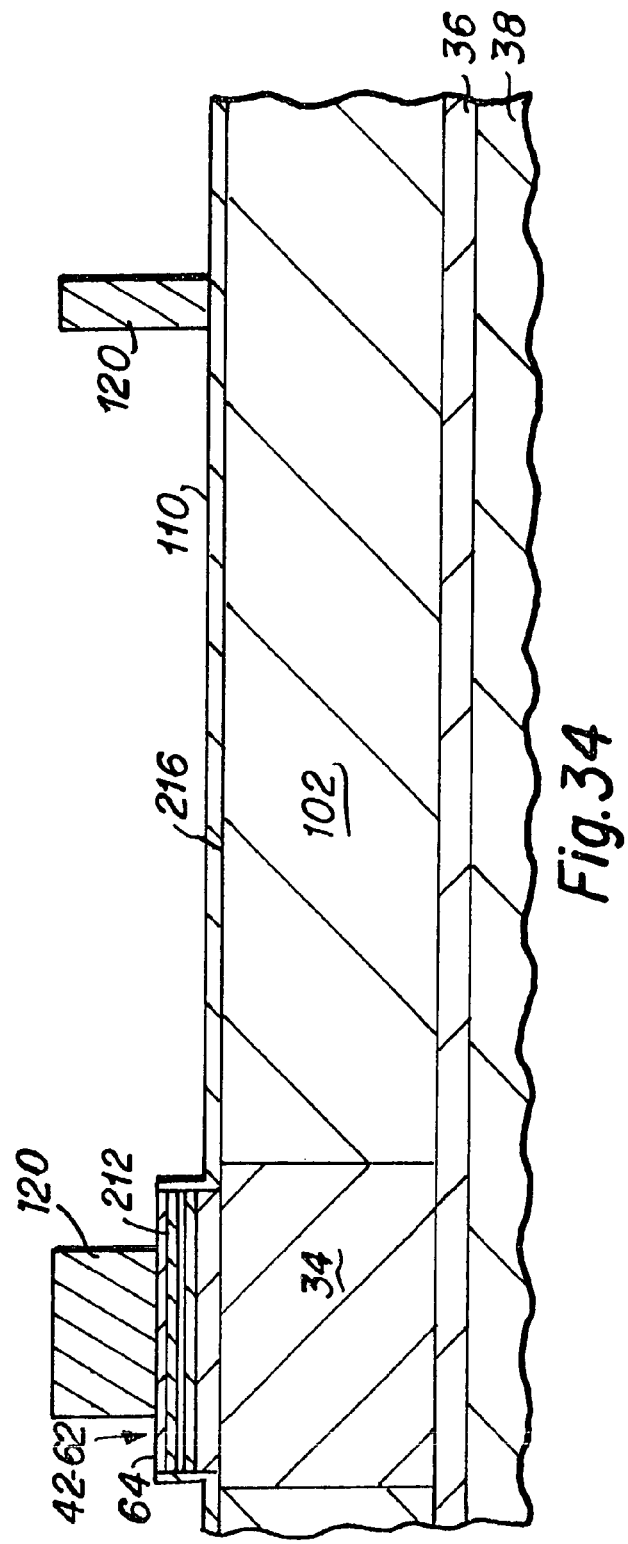
Figure 35:
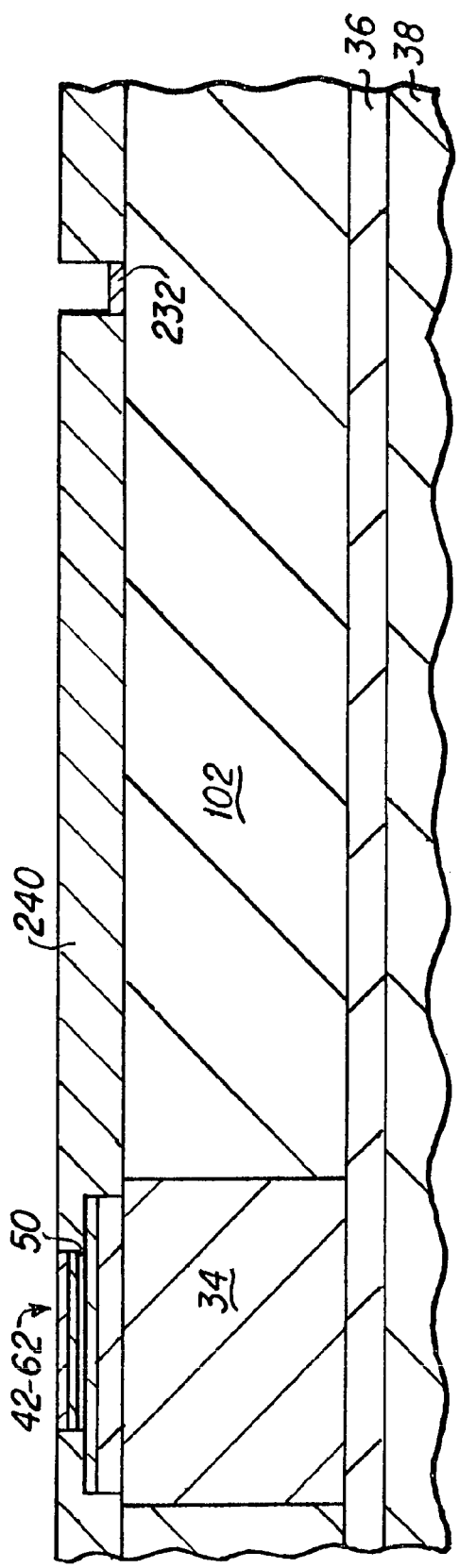
Figure 36:
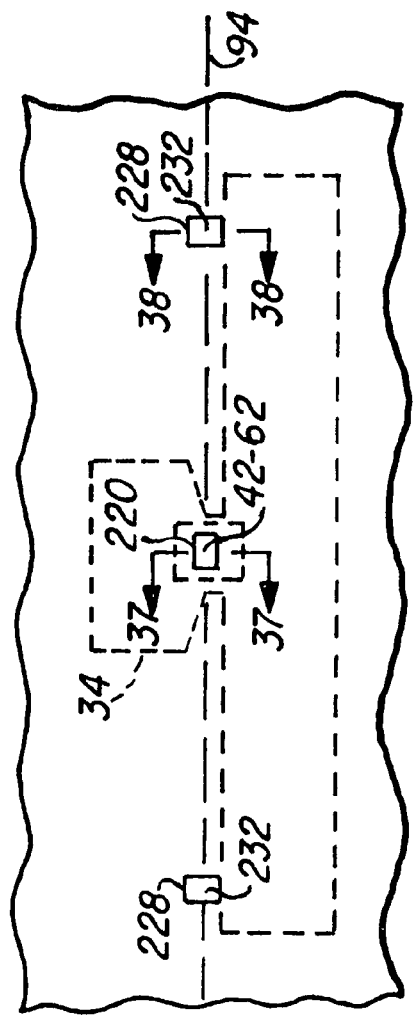

Thereafter, as depicted in the top plan view of FIG. 33 and the side cross-sectional view of FIG. 34, the stripe height milling mask 120 is fabricated upon the wafer surface. A partial ion milling step is next conducted, as was described hereabove with regard to the magnetic head embodiment 154 and depicted in FIGS. 25-28. As can be seen in FIGS. 35-38, which are essentially identical to FIG. 25-28, the back edge 220 of the sensor stack 42-62 is partially milled down through the tunnel barrier layer 50. Simultaneously, the back edges 228 of the ELGs 232 is fabricated. In this regard, as was described hereabove, the composition and thickness of the ELGs 232 is such that the ELG layer 216, 232 is completely milled through in the partial ion milling step of the sensor stack.

Thereafter, alumina fill 240 is deposited to the height of the sensor stack, and the stripe height milling mask 120 is subsequently removed as is depicted in FIGS. 35-38. Thereafter, further sensor fabrication steps as are known to those skilled in the art are conducted, as has been indicated hereabove.

A comparison of these fabrication steps of the magnetic read head embodiment 200 with the prior magnetic read head embodiment 154, reveals that fewer fabrication steps are involved in accomplishing the fabrication of the back edges of the sensor stack and ELGs of the magnetic head embodiment 200, and this fabrication method is therefore more advantageous as fewer fabrication steps are required to manufacture the magnetic head 200. However, as can be seen from FIG. 35, the tunnel barrier layer 50 and the ELG layer 232 are still disposed at different levels upon the wafer substrate. As a result, the differing image planes for focusing of the photomask on these layers still results in unwanted variation in the fabrication of the stripe height milling mask, and the problem of accurate fabrication of the back edge of the ELGs remains in the fabrication method for creating the magnetic read head embodiment 200. A further magnetic read head embodiment 300 of the present invention is next described, and it resolves the problem of accurate fabrication of the rear edge of the ELG.

The initial fabrication steps for the tunnel barrier sensor of the magnetic read head 300 of the present invention are similar to those of the magnetic read head embodiments 154 and 200, and similar structures identically numbered for ease of comprehension. Particularly, as depicted in FIG. 39 which is identical to FIGS. 29, 17 and 5, the first magnetic shield 34 is fabricated upon the insulation layer 36 that is deposited upon the wafer substrate 38. Thereafter, the sensor layers, which may include an antiferromagnetic layer 42, a pinned magnetic layer 46, tunnel barrier layer 50, free magnetic layer 54, and cap layer 62 are deposited across the surface of the wafer.

Figure 41:
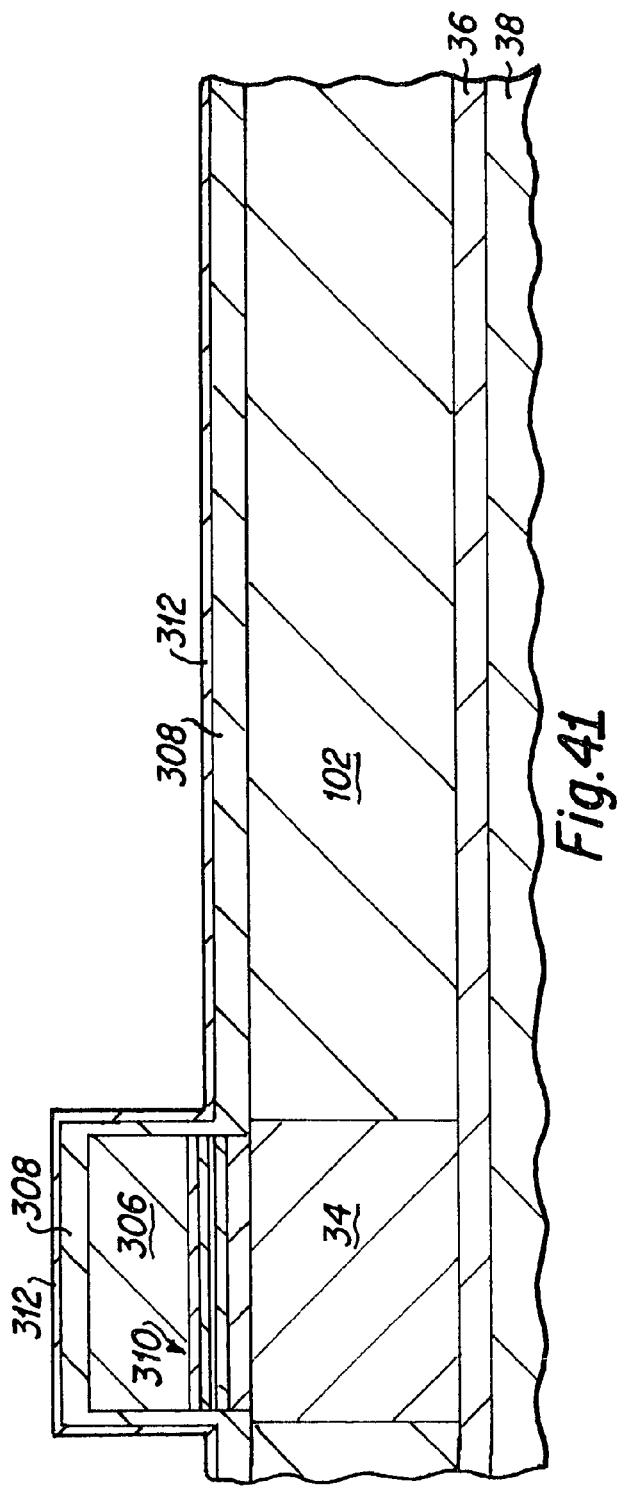

Thereafter, as depicted in FIGS. 40 and 41, a first milling mask 306 is fabricated upon the sensor layers. The first milling mask 306 covers an enlarged central area 310 of the sensor layers 42-62, such that field areas of the sensor layers are uncovered. An ion milling step is next conducted in which the unmasked sensor layers are removed.

Figure 42:
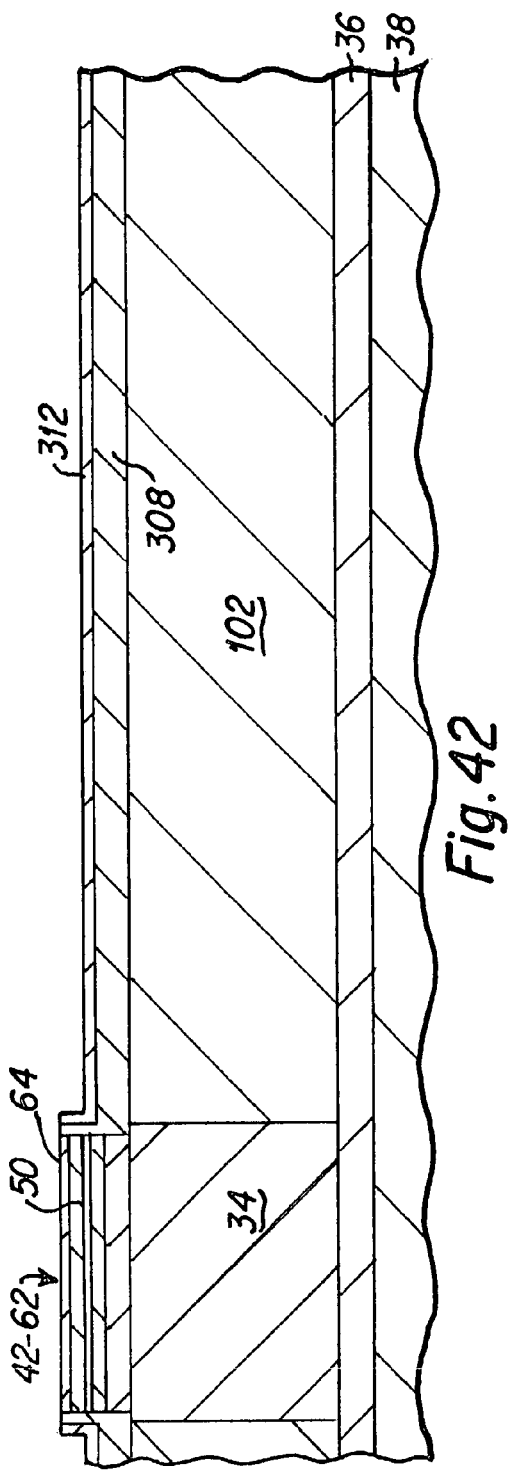

Unlike the fabrication of the magnetic read head embodiment 200 described hereabove, a fill layer 308 such as alumina, having a thickness that is approximately equal to the thickness of the AFM layer 42 plus pinned magnetic layer 46, is next deposited across the surface of the wafer, as is depicted in FIG. 41. An ELG material layer 312 is next deposited across the surface of the wafer. Following the deposition of the ELG material layer 312, the first milling mask 306 is removed, and the fabrication stage of the magnetic read head embodiment 300 is depicted in FIG. 42. It is significant to note that the ELG material layer 312 is deposited upon the alumina fill layer 308, such that the ELG material layer 312 is now disposed at the same level and is approximately coplanar with the tunnel barrier layer 50 of the sensor stack 42-62.

Figure 43:
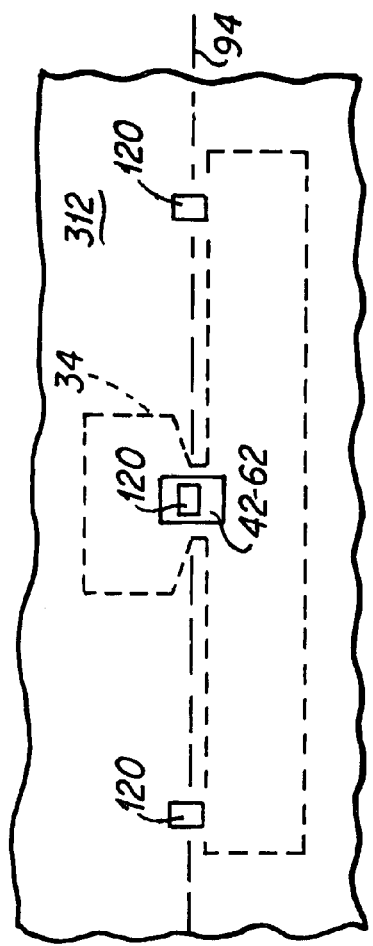
Figure 44:
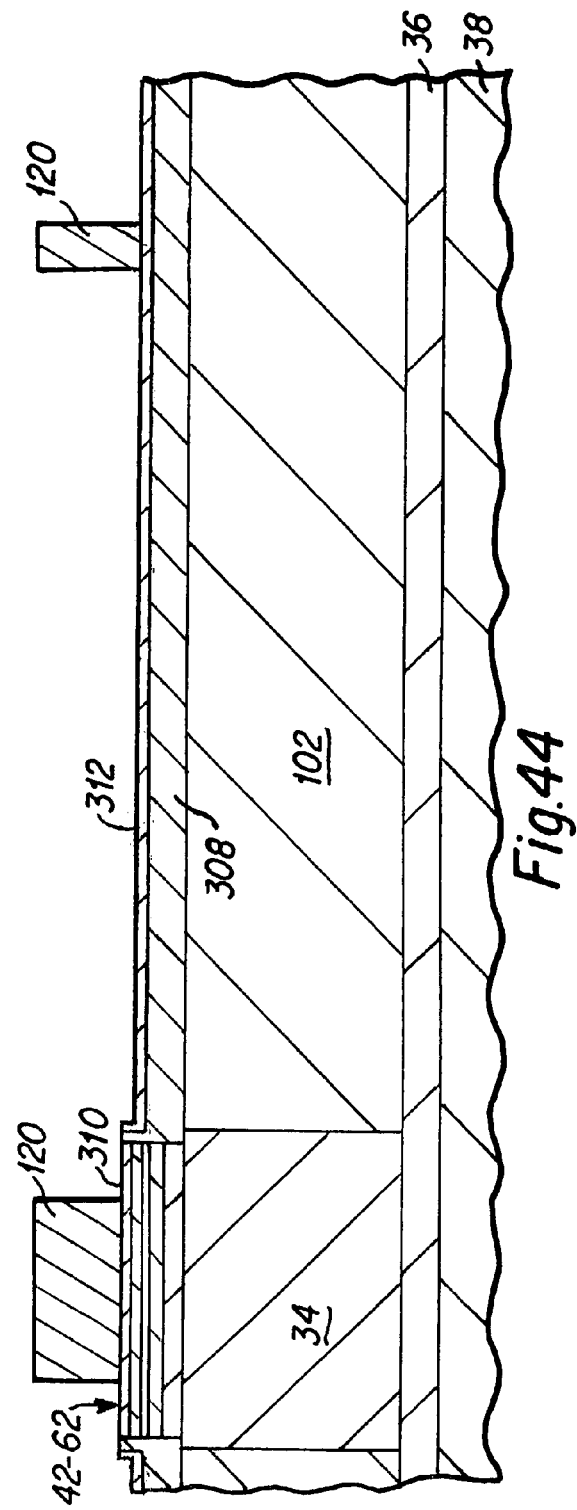
Figure 45:
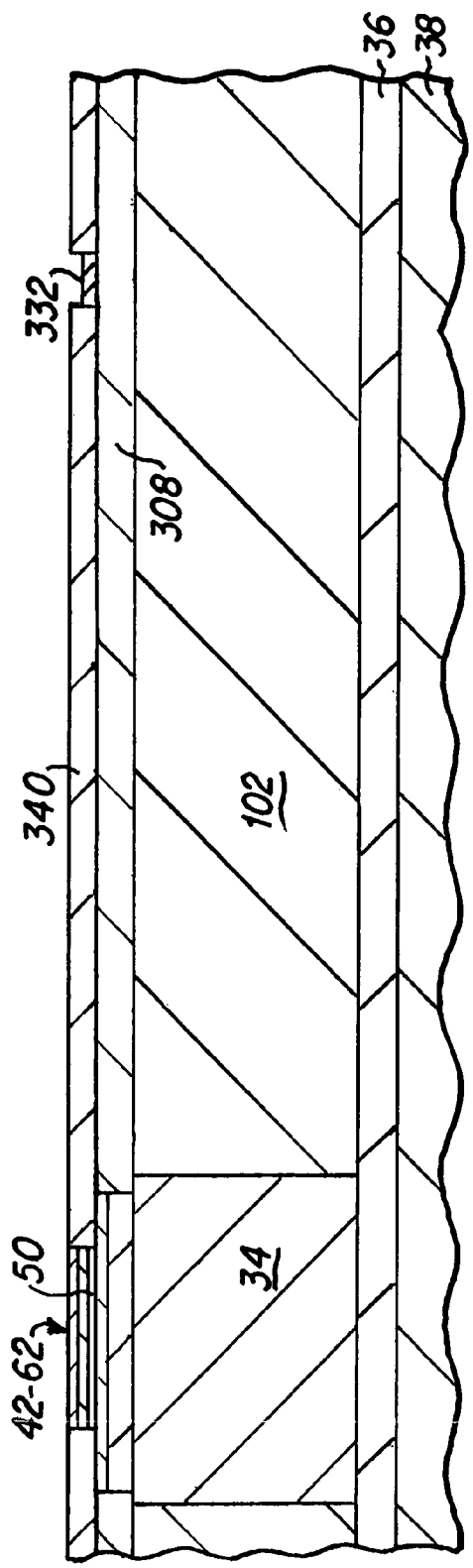
Figure 46:
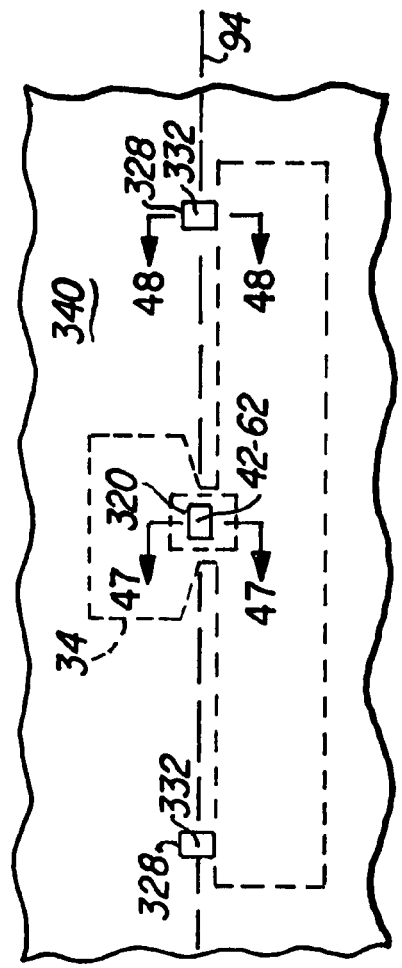
Figure 47:
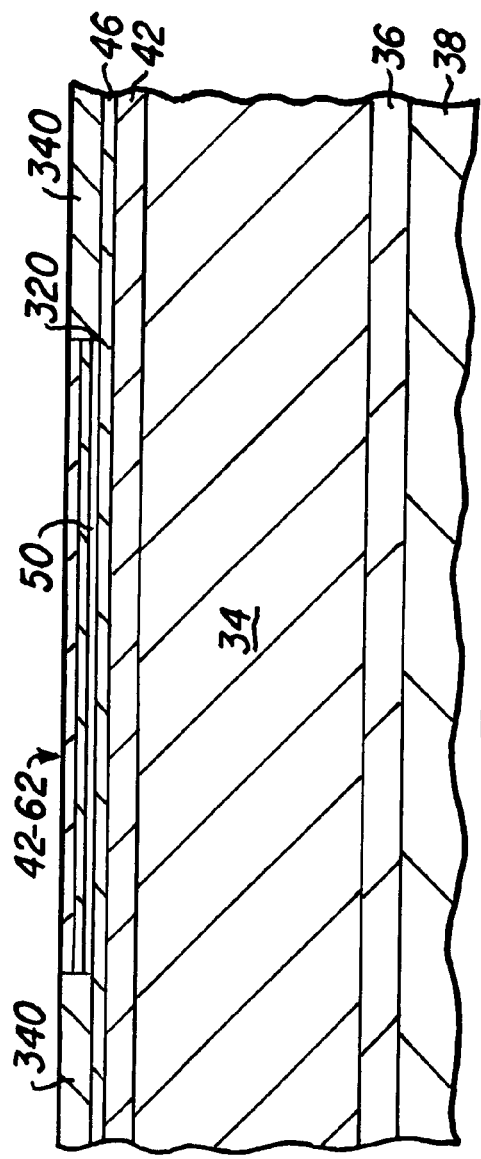
Figure 48:
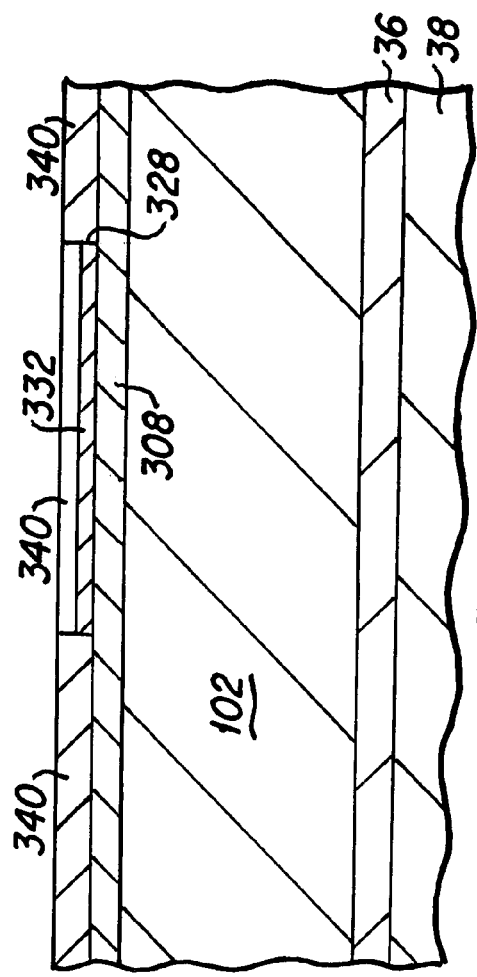

Thereafter, as depicted in the top plan view of FIG. 43 and the side cross-sectional view of FIG. 44, the stripe height milling mask 120 is fabricated upon the wafer surface. A partial ion milling step is next conducted, as was described hereabove with regard to the magnetic read head embodiment 200 and depicted in FIGS. 35-38, as can be seen in FIGS. 45-48, wherein FIG. 45 is a cross-sectional view, FIG. 46 is a top plan view, FIG. 47 is a cross-sectional view taken along lines 47-47 of FIG. 46 and FIG. 48 is a cross-sectional view taken along lines 48-48 of FIG. 46. The back edge 320 of the sensor stack is partially milled down through the tunnel barrier layer 50, and simultaneously, the back edge 328 of the ELGs 332 is fabricated. In this regard, as was described hereabove, the composition and thickness of the ELGs 332 is such that the ELG layer is completely milled through in the partial ion milling step of the sensor stack. Thereafter, alumina fill 340 is deposited to the height of the sensor stack, and the stripe height milling mask 120 is subsequently removed as is depicted in FIGS. 45-48. Thereafter, further sensor fabrication steps as are known to those skilled in the art are conducted, as has been indicated hereabove.

Following the fabrication of the read sensor of the present invention, further well known fabrication steps are undertaken to fabricate write head components (not shown) of a magnetic head of the present invention. Thereafter, the wafer is sliced into rows of magnetic heads and the air bearing surface of the magnetic head is fabricated to establish the stripe height of the sensor; individual magnetic heads suitable for installation within the hard disk drive 10 of the present invention are ultimately created. These further fabrication steps are well known to those skilled in the art.

It is therefore to be understood that the improved CPP read sensor of the magnetic head of the present invention is fabricated with partial milling steps that establish the back wall of the sensor. The back edge of the tunnel barrier layer 50 is milled through, however the sensor material below the tunnel barrier layer 50, including the pinned magnetic layer 46 and antiferromagnetic layer 42 are not milled, such that milling damage to the back edge of the tunnel barrier layer 50 is minimized. The back edges of the ELGs are fabricated during the partial ion milling step, and in a preferred embodiment the level of the ELG material is raised to be approximately coplanar with the tunnel barrier layer. As a result, the ELG material is in the same plane as the tunnel barrier layer, such that a more accurate back edge of the stripe height milling mask is fabricated at the ELG location. This results in a more accurate ELG back edge fabrication process. Additionally, where large numbers of magnetic heads are fabricated across the surface of a wafer substrate, the more accurate ELG back edge fabrication method results in a more accurate air bearing surface fabrication for various magnetic heads located across the wafer substrate. This ultimately results in a more consistent stripe height of the magnetic heads and a higher yield of magnetic heads from the manufacturing process.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What we claim is:

1. A magnetic head, comprising: a CPP read sensor including a tunnel barrier layer; at least one portion of ELG material that is coplanar with said tunnel barrier layer, wherein the CPP read sensor includes an antiferromagnetic layer, wherein the tunnel barrier layer has a back edge defined by milling, wherein the antiferromagnetic layer extends beyond the back edge of the tunnel barrier layer in a stripe height direction, wherein the ELG material has a back edge defined by the milling.

2. A magnetic head, comprising: a CPP read sensor including a tunnel barrier layer; at least one portion of ELG material that is coplanar with said tunnel barrier layer, wherein the CPP read sensor includes an antiferromagnetic layer, wherein the antiferromagnetic layer extends beyond a back edge of the tunnel barrier layer in a stripe height direction.

3. A magnetic head as described in claim 2, wherein a portion of the antiferromagnetic layer has been removed.

4. A hard disk drive, comprising: a magnetic head including a CPP read sensor including a tunnel barrier layer; at least one portion of ELG material that is coplanar with said tunnel barrier layer, wherein the CPP read sensor includes an antiferromagnetic layer, Wherein the tunnel barrier layer has a back edge defined by milling, wherein the antiferromagnetic layer extends beyond the back edge of the tunnel barrier layer in a stripe height direction, wherein the ELG material has a back edge defined by the milling.

5. A hard disk drive as described in claim 4, wherein a back edge of the tunnel barrier layer and a back edge of the ELG material have physical characteristics of having been simultaneously milled.

6. A hard is drive, comprising: a magnetic head including a CPP read sensor including a tunnel barrier layer; at least one portion of ELG material that is coplanar with said tunnel barrier layer, wherein the CPP read sensor-includes an antiferromagnetic layer, wherein the antiferromagnetic layer extends beyond a back edge of the tunnel barrier layer in a stripe height direction.

7. A hard disk drive as described in claim 6, wherein a portion of the antiferromagnetic layer has been removed.

\* \* \* \* \*